(12) United States Patent
Sun et al.

(10) Patent No.: US 9,294,369 B2
(45) Date of Patent: Mar. 22, 2016

(54) METHOD AND DEVICE FOR PROCESSING LOCATION INFORMATION OF FAULT POINT

(71) Applicant: Huawei Technologies Co., Ltd.

(72) Inventors: Changsheng Sun, Nanjing (CN); Shaojun Fan, Beijing (CN); Yulin Yuan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 237 days.

(21) Appl. No.: 14/081,754

(22) Filed: Nov. 15, 2013

(65) Prior Publication Data

US 2014/0071835 A1 Mar. 13, 2014

Related U.S. Application Data

(63) Continuation of application No. PCT/CN2013/074437, filed on Apr. 19, 2013.

(30) Foreign Application Priority Data

Aug. 30, 2012 (CN) .......................... 2012 1 0315421

(51) Int. Cl.
*H04L 12/703* (2013.01)
*H04L 12/26* (2006.01)
(Continued)

(52) U.S. Cl.
CPC ............. *H04L 43/06* (2013.01); *H04L 41/0677* (2013.01); *H04L 45/28* (2013.01); *H04L 45/50* (2013.01); *H04L 12/437* (2013.01); *H04L 41/065* (2013.01); *H04L 41/0873* (2013.01); *H04L 45/22* (2013.01)

(58) Field of Classification Search
CPC ....... H04L 45/22; H04L 45/28; H04L 12/437; H04L 45/50
See application file for complete search history.

(56) References Cited

U.S. PATENT DOCUMENTS

2003/0145246 A1* 7/2003 Suemura .......................... 714/2
2006/0274645 A1 12/2006 Bradford et al.
(Continued)

FOREIGN PATENT DOCUMENTS

CN 1848775 A 10/2006
CN 101056203 A 10/2007
(Continued)

OTHER PUBLICATIONS

Hewlett-Packard Company, et al., "A Mechanism for Status Monitoring and Impact Analysis of MPLS Traffic Engineering Tunnels," Research Disclosure, Mason Publications, Hampshire GB, vol. 533, No. 26, Sep. 30, 2008, 5 pages.

(Continued)

*Primary Examiner* — Raj Jain
(74) *Attorney, Agent, or Firm* — Slater & Matsil, L.L.P.

(57) ABSTRACT

Embodiments of the present invention provide a method and a device for processing location information of a fault point. The method includes: obtaining, by an ingress node of a tunnel, first location information of a fault point on a link traversed by the tunnel, where the first location information of the fault point includes an identifier of an upstream node of the fault point and an identifier of an interface that is connected to the fault point and located on the upstream node of the fault point; and providing, by the ingress node, the first location information of the fault point to a user so that the user determines a location of the fault point corresponding to a tunnel fault. With the technical solutions of the present invention, the location of the fault point can be determined, and efficiency of troubleshooting specific to the tunnel fault can be improved.

30 Claims, 7 Drawing Sheets

(51) Int. Cl.
  *H04L 12/723* (2013.01)
  *H04L 12/24* (2006.01)
  *H04L 12/437* (2006.01)
  *H04L 12/707* (2013.01)

(56) References Cited

U.S. PATENT DOCUMENTS

| | | | |
|---|---|---|---|
| 2007/0280251 A1* | 12/2007 | Wang et al. | 370/395.1 |
| 2008/0037526 A1 | 2/2008 | Dong | |
| 2009/0225652 A1 | 9/2009 | Vasseur et al. | |
| 2014/0010074 A1* | 1/2014 | Ye | 370/228 |
| 2014/0071834 A1* | 3/2014 | Sun et al. | 370/242 |

FOREIGN PATENT DOCUMENTS

| | | |
|---|---|---|
| CN | 101710899 A | 5/2010 |
| CN | 102833108 A | 12/2012 |
| CN | 102833109 A | 12/2012 |
| EP | 1548980 A1 | 6/2005 |

OTHER PUBLICATIONS

Extended European Search Report received in Application No. 13763173.5 mailed May 19, 2014, 7 pages.

"Chinese International Search Report," International Application No. PCT/CN2013/074437, mailing date: Jul. 25, 2013, 12 pages.

"Chinese Office Action," Application No. 201210315421.4, Sep. 4, 2013, 7 pages.

Braden, R., et al., "Resource ReSerVation Protocol (RSVP)—Version 1 Functional Specification" Network Working Group, rfc2205, Sep. 1997, 144 pages.

Braden, R., et al., "Resource ReSerVation Protocol (RSVP)—Version 1 Message Processing Rules," Network Working Group, rfc2209, Sep. 1997, 32 pages.

Awduche, D., et al., "RSVP-TE: Extensions to RSVP for LSP Tunnels" Network Working Group, rfc3209, Dec. 2001, 81 pages.

* cited by examiner

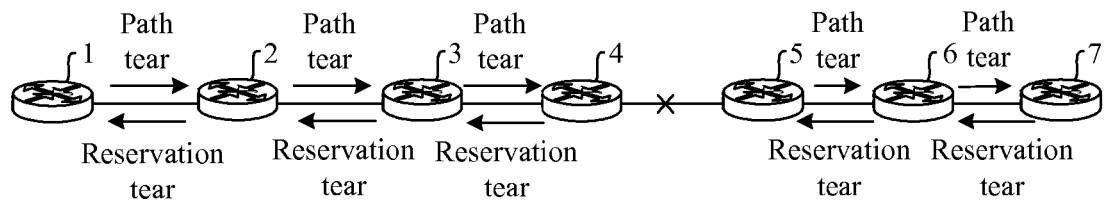

FIG. 1

An ingress node of a tunnel obtains first location information of a fault point on a link traversed by the tunnel, where the first location information of the fault point includes an identifier of an upstream node of the fault point and an identifier of an interface that is connected to the fault point and located on the upstream node of the fault point
201

The ingress node provides the first location information of the fault point to a user so that the user determines a location of the fault point corresponding to a tunnel fault
202

FIG. 2

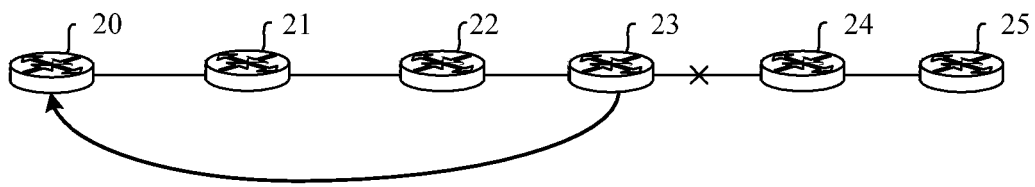

FIG. 3

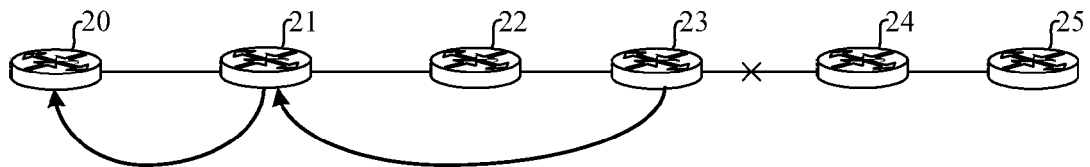

FIG. 4

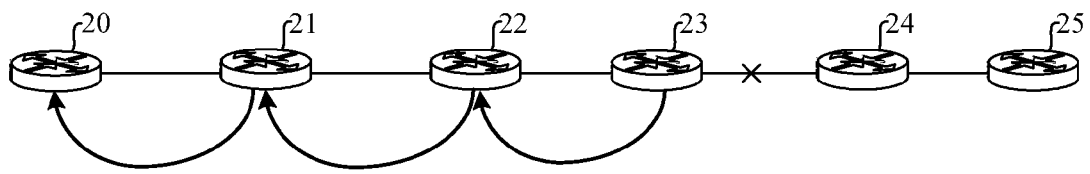

FIG. 5

| A transit node on a tunnel obtains first location information of a fault point on a link traversed by the tunnel, where the first location information of the fault point includes an identifier of the transit node and an identifier of an interface that is connected to the fault point and located on the transit node, where the transit node is an upstream node of the fault point | 601 |
|---|---|

↓

| The transit node sends the first location information of the fault point to an ingress node of the tunnel so that the ingress node provides a user with the first location information of the fault point corresponding to a tunnel fault | 602 |
|---|---|

FIG. 6

METHOD AND DEVICE FOR PROCESSING LOCATION INFORMATION OF FAULT POINT

This application is a continuation of International Application No. PCT/CN2013/074437, filed on Apr. 19, 2013, which claims priority to Chinese Patent Application No. 201210315421.4, filed on Aug. 30, 2012, both of which are hereby incorporated herein by reference in their entireties.

TECHNICAL FIELD

The present invention relates to communications technologies, and in particular, to a method and a device for processing location information of a fault point.

BACKGROUND

In a radio communication network, a base station is interconnected with a radio network controller (RNC) of a core network over a radio backhaul bearer network. With explosive growth of radio traffic, higher and higher requirements are imposed on the radio backhaul bearer network. A trend in the communications industry is to use an Internet Protocol (IP) network, such as an IP radio access network (RAN) as a radio backhaul bearer network.

The IP RAN network bears communication traffic in a typical full-IP manner. On a public network forwarding layer, a label switch path (LSP) generated through signaling negotiation is used for bearing communication traffic; on a service layer, a virtual private network (VPN) is used for bearing communication traffic. Generally, LSP types include a Label Distribution Protocol (LDP) LSP and a Traffic Engineering (TE) LSP. Due to high reliability and maintainability of the TE LSP, operators generally select a TE LSP for bearing VPN traffic. Generally, the term "tunnel" (Tunnel) is usually used to represent a TE LSP or an LSP combination formed by an active TE LSP and a standby TE LSP. In an actual application, a Multi-Protocol Label Switching (MPLS) tunnel is generally used to bear VPN traffic. In the MPLS tunnel terminology, generally an initial node of a tunnel is referred to as an ingress node, an end node of the tunnel is referred to as an egress node, and an intermediate node is referred to as a transit node.

When a link is faulty in an IP RAN network, after detecting the fault, upstream a nodes of a fault point and downstream nodes of the fault point will initiate a tunnel tearing process directed to the ingress node and the egress node of the MPLS tunnel respectively. With the MPLS tunnel being torn, the user cannot perform troubleshooting specific to a tunnel fault effectively.

SUMMARY OF THE INVENTION

Embodiments of the present invention provide a method and a device for processing location information of a fault point so as to provide the location information of the fault point to a user to improve troubleshooting efficiency for a tunnel fault.

In a first aspect, an embodiment of the present invention provides a method for sending location information of a fault point, including:

obtaining, by an ingress node of a tunnel, first location information of a fault point on a link traversed by the tunnel, where the first location information of the fault point includes an identifier of an upstream node of the fault point and an identifier of an interface that is connected to the fault point and located on the upstream node of the fault point; and providing, by the ingress node, the first location information of the fault point to a user so that the user determines a location of the fault point corresponding to a tunnel fault.

In a second aspect, an embodiment of the present invention provides a method for sending location information of a fault point, including:

obtaining, by a transit node on a tunnel, first location information of a fault point on a link traversed by the tunnel, where the first location information of the fault point includes an identifier of the transit node and an identifier of an interface that is connected to the fault point and located on the transit node, where the transit node is an upstream node of the fault point; and sending, by the transit node, the first location information of the fault point to an ingress node of the tunnel so that the ingress node provides a user with the first location information of the fault point corresponding to a tunnel fault.

In a third aspect, an embodiment of the present invention provides a method for processing fault alarm information, including:

receiving, by a network management device, tunnel fault alarm information sent by an ingress node of a tunnel, where the tunnel fault alarm information includes first location information of a fault point on a link traversed by the tunnel, and the first location information of the fault point includes an identifier of an upstream node of the fault point and an identifier of an interface that is connected to the fault point and located on the upstream node of the fault point; and determining, by the network management device, a location of the fault point corresponding to a tunnel fault according to the first location information of the fault point.

In a fourth aspect, an embodiment of the present invention provides an ingress node device, including:

a first obtaining module, configured to obtain first location information of a fault point on a link traversed by a tunnel where the ingress node device is located, where the first location information of the fault point includes an identifier of an upstream node of the fault point and an identifier of an interface that is connected to the fault point and located on the upstream node of the fault point; and a providing module, configured to provide the first location information of the fault point to a user so that the user determines a location of the fault point corresponding to a tunnel fault.

In a fifth aspect, an embodiment of the present invention provides a transit node device, including:

a second obtaining module, configured to obtain first location information of a fault point on a link traversed by a tunnel where the transit node device is located, where the first location information of the fault point includes an identifier of the transit node device and an identifier of an interface that is connected to the fault point and located on the transit node device, where the transit node device is an upstream node of the fault point; and a first sending module, configured to send the first location information of the fault point to an ingress node of the tunnel so that the ingress node provides a user with the first location information of the fault point corresponding to a tunnel fault.

In a sixth aspect, an embodiment of the present invention provides a network management device, including:

a first receiving module, configured to receive tunnel fault alarm information sent by an ingress node of a tunnel, where the tunnel fault alarm information includes first location information of a fault point on a link traversed by the tunnel, and the first location information of the fault point includes an identifier of an upstream node of the fault point and an identifier of an interface that is connected to the fault point and located on the upstream node of the fault point; and a determining module, configured to determine a location of the fault point corresponding to a tunnel fault according to the first location information of the fault point.

According to the method and the device for sending location information of a fault point provided in the embodiments of the present invention, after obtaining first location information of a fault point on a link traversed by a tunnel, an ingress node of the tunnel provides the obtained first location information of the fault point to a user, so that the user can determine a location of the fault point corresponding to a tunnel fault, thereby providing conditions for performing troubleshooting according to the determined location of the fault point and improving efficiency of troubleshooting specific to the tunnel fault.

According to the method and the device for sending location information of a fault point provided in the embodiments of the present invention, after obtaining the first location information of the fault point on the link traversed by the tunnel, a transit node of the tunnel sends the first location information of the fault point to the ingress node of the tunnel, so that the ingress node can provide the location information of the fault point to the user and the user can determine the location of the fault point corresponding to the tunnel fault and perform troubleshooting based on the determined location of the fault point, thereby improving efficiency of troubleshooting specific to the tunnel fault.

According to the method and the device for processing fault alarm information provided in the embodiments of the present invention, a network management device obtains the first location information of a fault point on a link traversed by a tunnel among tunnel fault alarm information sent by an ingress node of the tunnel, and determines a location of the fault point corresponding to the tunnel fault according to the first location information, thereby providing conditions for performing troubleshooting according to the location of the fault point and improving efficiency of troubleshooting specific to the tunnel fault.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of an MPLS tunnel tearing process in the prior art;

FIG. 2 is a flowchart of a method for sending location information of a fault point according to an embodiment of the present invention;

FIG. 3 to FIG. 5 are several schematic diagrams of a transmission path used by an upstream node of a fault point to send location information of the fault point to an ingress node according to an embodiment of the present invention;

FIG. 6 is a flowchart of a method for sending location information of a fault point according to another embodiment of the present invention;

DETAILED DESCRIPTION OF ILLUSTRATIVE EMBODIMENTS

Figure 7:
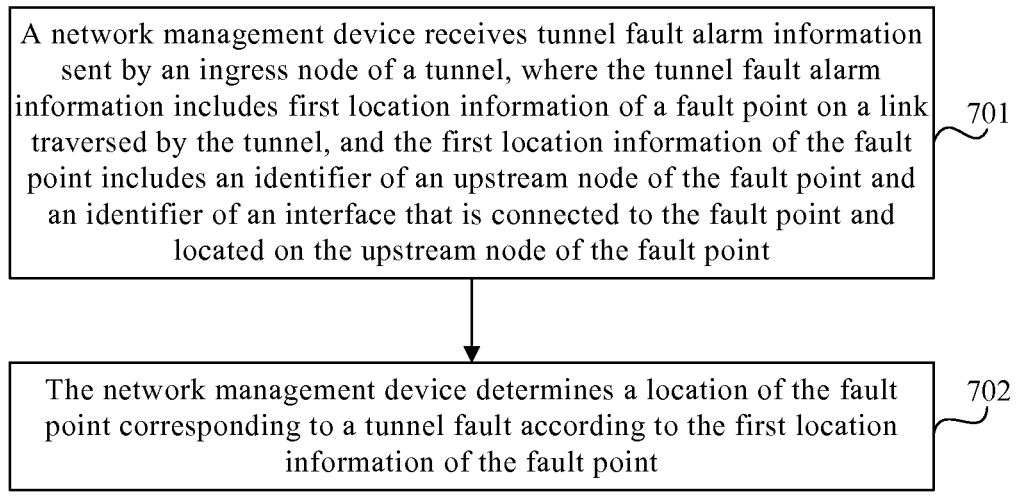
FIG. 7 is a flowchart of a method for sending fault alarm information according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

All the following embodiments of the present invention are applicable to a network that uses an MPLS tunnel to bear VPN traffic, such as but without being limited to, an IP RAN network that uses the MPLS tunnel to bear the VPN traffic. The IP RAN network bears communication traffic in a typical full-IP manner. The IP RAN network not only uses, on a public network forwarding layer, an LSP generated through signaling negotiation and uses a VPN on a service layer, but also uses fibers on a physical layer and uses an Ethernet or a Gigabit Ethernet on a link layer, where signaling is based on a routing protocol and a Multi-Protocol Label Switching (MPLS) suite/Resource Reservation Protocol (RSVP).

Common VPN types include pseudo-wire emulation edge to edge (Pseudo-Wire Emulation Edge to Edge, PWE3 for short), virtual private LAN service (VPLS), and layer-3 VPN (L3VPN). The VPN type used by the IP RAN network depends on the type of a base station. If the base station supports an Ethernet interface, L3PVN is generally selected; if the base station does not support Ethernet interfaces but supports only E1 and/or asynchronous transfer mode (ATM) interfaces and the like, PWE3 is selected. The VPN involved in all the following embodiments of the present invention may be any type of VPN.

The IP RAN network is generally formed in a ring networking manner, or in a ring plus chain networking manner. All the following embodiments of the present invention are applicable to various networking manners.

As shown in FIG. 1, an MPLS tunnel tearing process in the prior art includes: An upstream node of a fault point (that is, a transit node 4) detects a fault, interrupts a local RSVP activity, deletes a local reservation state block (RSB), and sends a reservation tear (ResvTear) message to its upstream node until the message reaches an ingress node 1; after receiving the ResvTear message, the ingress node 1 sets a tunnel state to Down (Down), turns back to send a path tear (PathTear) message to its downstream node until the message reaches an upstream node of the fault point (that is, the transit node 4); a downstream node of the fault point (that is, a transit node 5) detects the fault, interrupts the local RSVP activity, deletes the local path state block (PSB), sends a path tear message to its downstream node until the message reaches an egress node 7; after receiving the path tear message, the egress node 7 turns back to send a reservation tear message to its upstream node until the message reaches the downstream node of the fault point (that is, the transit node 5). In the foregoing process, the node that receives the path tear message deletes the local PSB, and the node that receives the reservation tear message deletes the local RSB.

After the tunnel is torn due to the fault, the user cannot learn the location of the fault point corresponding to the tunnel fault, which leads to low efficiency of troubleshooting. Generally, an ingress node of the tunnel generates tunnel fault alarm information and sends the tunnel fault alarm information to a network management device, to notify the network management device that the link where the tunnel is located is faulty. The network management device is mainly responsible for monitoring the operation status of the VPN network, and needs to locate a fault cause when detecting a fault. However, the tunnel fault alarm information sent by the ingress node indicates only occurrence of the fault on the tunnel but indicates no specific location of the fault point. Moreover, when the network management device receives the tunnel fault alarm information, the tunnel has been torn. Therefore, the network management device cannot perform troubleshooting by using a path existent before the occurrence of the tunnel fault, but can only examine the entire network to locate a fault cause according to information such as network understandings and tunnel configuration requirements, and make repeated attempts to set up a tunnel to confirm removal of the fault, which leads to very low efficiency. The following embodiment of the present invention provides a solution to such a problem.

FIG. 2 is a flowchart of a method for sending location information of a fault point according to an embodiment of the present invention. As shown in FIG. 2, the method in this embodiment includes:

Step 201: An ingress node of a tunnel obtains first location information of a fault point on a link traversed by the tunnel, where the first location information of the fault point includes an identifier of an upstream node of the fault point and an identifier of an interface that is connected to the fault point and located on the upstream node of the fault point.

In the MPLS tunnel terminology, an initial node of a tunnel is referred to as an ingress node, an end node of the tunnel is referred to as an egress node, and an intermediate node is referred to as a transit node. Correspondingly, in the VPN terminology, a VPN endpoint is referred to as a provider edge (PE) node, and a VPN intermediate node is referred to as a provider (P) node. In fact, the ingress node and the egress node of the tunnel are two endpoints of the VPN borne by the tunnel, that is, the ingress node and the egress node are PE nodes; and the transit node of the tunnel is an intermediate node of the VPN borne by the tunnel, that is, the transit node is a P node. In all embodiments of the present invention, names in the MPLS tunnel terminology are employed.

In an MPLS tunnel, an identifier of each node on the tunnel may be expressed by a label switch router (LSR) identifier (ID) of the node. Optionally, the identifier of an upstream node of the fault point in this embodiment may be an LSR ID of the upstream node of the fault point. Optionally, the identifier of an interface may be any information that can uniquely identify an interface, such as an IP address, an index number or a name of the interface. Therefore, the identifier of an interface that is connected to the fault point and located on the upstream node of the fault point may be an IP address, an index number or a name of the interface. Preferably, in the first location information, the IP address of the interface may be used as the identifier of the interface.

In this embodiment, faults that occur on the link traversed by the tunnel may include, but without being limited to, the following faults:

(1) A node on the link traversed by the tunnel is faulty, for example, breaks down, where the node may be a node other than the ingress node, that is, the transit node or the egress node is faulty. In this case, the fault point is the faulty node, and the upstream node of the faulty point is the upstream node of the fault point. If the faulty node is a downstream node of the ingress node (that is, a transit node directly connected to the ingress node), the upstream node of the fault point is the ingress node; if the faulty node is a transit node other than the downstream node of the ingress node, the upstream node of the fault point is also a transit node; if the faulty node is an egress node, the upstream node of the faulty node is a transit node directly connected to the egress node.

It is hereby pointed out that, in all embodiments of the present invention, an upstream node of a node refers to a node that is directly connected to the node and located in an upstream direction of the node; and a downstream node of a node refers to a node that is directly connected to the node and located in a downstream direction of the node. The upstream direction refers to being upstream in the traffic direction of the tunnel, and the downstream direction refers to being downstream in the traffic direction of the tunnel. For example, if the traffic flows from the ingress node to the egress node, the upstream direction refers to a direction close to the ingress node, and the downstream direction refers to a direction close to the egress node.

(2) A link between any two directly connected nodes on the link traversed by the tunnel is faulty, for example, the link is cut off, where the two directly connected nodes may be an ingress node and its downstream node (a transit node), or may be any two directly connected transit nodes, or may be an egress node and its upstream node (a transit node). In this case, the fault point is the faulty link, and the upstream node of the fault point is an upstream node that is connected between two nodes on the link and located in the traffic direction of the tunnel, and, if the faulty link is a link between the ingress node and its downstream node, the upstream node of the fault point is an ingress node.

(3) On any two directly connected nodes on the link traversed by the tunnel, configuration information about the tunnel is mismatched, where the two directly connected nodes may be an ingress node and its downstream node (a transit node), or may be any two directly connected transit nodes, or may be an egress node and its upstream node (a transit node). In this case, the two directly connected nodes are fault points of each other. This embodiment only considers a scenario that, in two directly connected nodes, the fault point of an upstream node located in the traffic direction of the tunnel is a downstream node located in the traffic direction of the tunnel; and, in this case, the upstream node of the fault point is the upstream node located in the traffic direction of the tunnel in the two directly connected nodes. If the two directly connected nodes are an ingress node and its downstream node, this embodiment is described through an example where the fault point is the downstream node of the ingress node and the upstream node of the fault point is the ingress node.

In view of the several fault scenarios described above, it can be known that there are different manners for the ingress node of the tunnel to obtain the first location information of the fault point on the link where the tunnel is located.

If the fault occurs between the ingress node and the downstream node of the ingress node, the ingress node may use the following manners to obtain the first location information of the fault point on the link where the tunnel is located:

when perceiving a fault of the link between the ingress node and the downstream node of the ingress node or perceiving a fault of the downstream node of the ingress node, the ingress node may determine that the fault point is the link between the ingress node and the downstream node of the ingress node or is the downstream node of the ingress node, and may determine that the ingress node itself is an upstream node of the fault point, and therefore, obtain an identifier of the ingress node itself and an identifier of an interface that is connected to the downstream node of the ingress node and located on the ingress node, and use the identifiers as the first location information of the fault point; or when perceiving mismatch between configuration information corresponding to the tunnel on the ingress node and configuration information corresponding to the tunnel on the downstream node of the ingress node the ingress node may determine that the fault point is the downstream node of the ingress node and may determine that the ingress node itself is an upstream node of the fault point, and therefore, obtain an identifier of the ingress node itself and an identifier of an interface that is connected to the downstream node of the ingress node and located on the ingress node, and use the identifiers as the first location information of the fault point. The configuration information here mainly includes but is not limited to: an IP address configured for an interface traversed by the tunnel (which should match the IP address of the correspondent node), MPLS enabling, TE enabling, and the like. Based on this, mismatch of configuration information in this embodiment includes but is not limited to: mismatch of IP addresses of interfaces on both ends of a link traversed by the tunnel, MPLS is not enabled on at least one of the two interfaces on both ends of the link traversed by the tunnel, and MPLS TE is not enabled on at least one of the two interfaces on both ends of the link traversed by the tunnel.

The manner for the ingress node to perceive that configuration information on the ingress node and configuration information on the downstream node of the ingress node are different may be: The ingress node deletes local configuration information, for example, deletes the IP address of the interface traversed by the tunnel, deletes MPLS enabling, deletes MPLS TE enabling, or the like. In addition, when the correspondent node (that is, the downstream node of the ingress node) deletes the local configuration, communication will fail between both sides. Therefore, the ingress node may also determine mismatch of configuration information between the ingress node and its downstream node by perceiving deletion of the local configuration information on the correspondent node in a certain manner. Optionally, the ingress node may perceive deletion of the local configuration on its downstream node by perceiving timeout of transmission between the two. However, transmission timeout is not all caused by mismatch of configuration information, but both sides cannot communicate with each other normally, that is, the tunnel is faulty, no matter which cause causes the transmission timeout.

Therefore, when perceiving timeout of transmission between the ingress node and the downstream node of the ingress node, the ingress node obtains an identifier of the ingress node and an identifier of an interface that is connected to the downstream node of the ingress node and located on the ingress node, and uses the identifiers as the first location information of the fault point. In this manner, the ingress node is an upstream node of the fault point. The manner used by the ingress node to perceive timeout of transmission between the ingress node and the downstream node of the ingress node may depend on the device vendor and the application scenario. For example, a hello packet or a packet similar to the hello packet is sent between the ingress node and the downstream node of the ingress node to keep connection. If the ingress node fails to receive the packet within a specified reception time, the ingress node may determine timeout of transmission between the ingress node and its downstream node, and determine occurrence of a fault.

If the fault does not occur between the ingress node and the downstream node of the ingress node, but occurs between two transit nodes or occurs between an egress node and its upstream node, the ingress node may use the following manner to obtain the first location information of the fault point on the link where the tunnel is located:

The ingress node receives the first location information of the fault point sent by the upstream node of the fault point. After perceiving the fault, the upstream node of the fault point obtains its own identifier and an identifier of an interface that is connected to the fault point and located on the upstream node, uses the identifiers as the first location information of the fault point, and then sends the first location information of the fault point to the ingress node. The ingress node receives the first location information of the fault point sent by the upstream node of the fault point. The manner for the upstream node of the fault point to perceive the fault is similar to the manner for the ingress node to perceive the fault, which will not be described in detail herein again.

Optionally, the upstream node of the fault point may use, but without being limited to, the following manners to send the first location information of the fault point to the ingress node.

The first manner is: The upstream node of the fault point may define a new type of RSVP message, such as an RSVP notify (Notify) message, where the first location information of the fault point is carried in the RSVP Notify message and sent to the ingress node. The RSVP Notify message is independent of the existing standard RSVP message (such as reservation error message, path error message, reservation tear message, path tear message, and the like). Such a manner is better compatible with the standard, and is especially applicable to a scenario of hybrid networking of devices of different vendors. Such a manner requires only that the upstream node of the fault point and the ingress node are from the same vendor and support the RSVP Notify message, and imposes no impact on devices of other vendors.

Preferably, in this manner, the upstream node of the faulty node may send an RSVP Notify message to the ingress node before sending a second reservation tear message to the ingress node, that is, send the first location information of the fault point to the ingress node before the tunnel is torn. To distinguish a standard reservation tear message from a subsequent extended reservation tear message, the standard reservation tear message is herein referred to as a second reservation tear message, and the extended reservation tear message is referred to as a first reservation tear message. The words "first" and "second" herein do not limit the number of messages or indicate order of messages, but serve the distinguishing purpose only.

The second manner is: The upstream node of the fault point extends the reservation tear message in the existing RSVP message, where the first location information of the fault point is carried in the extended reservation tear message (that is, the first reservation tear message) and sent to the ingress node. The manner of extending the reservation tear message is not limited. For example, a new field may be added to carry the first location information of the fault point; or an existing field may be redefined to carry the first location information of the fault point, and so on. For example, the newly-added field may be, but without being limited to, a type-length-value (TLV) field.

Optionally, in this manner, the first reservation tear message may not only carry the first location information of the fault point to the ingress node, but also inform the ingress node that the tunnel needs to be torn. That is, the first location information of the fault point is sent in parallel with the tunnel tearing process. After receiving the first reservation tear message, the ingress node can obtain the first location information of the fault point, and learn that the tunnel is faulty and needs to be torn. Therefore, the ingress node sets the tunnel to Down, and turns back to send a path tear message to its downstream node to tear the tunnel.

The third manner is: The upstream node of the fault point extends a path error (PathErr) message in the existing RSVP message, where the first location information of the fault point is carried in the extended path error message and sent to the ingress node. The manner of extending the path error message is not limited. For example, a new field may be added to carry the first location information of the fault point; or an existing field may be redefined to carry the first location information of the fault point, and so on. For example, the newly-added field may be, but without being limited to, a TLV field.

Preferably, in this manner, the upstream node of the faulty node may send an extended path error message to the ingress node before sending a second reservation tear message to the ingress node, that is, send the first location information of the fault point to the ingress node before the tunnel is torn.

The fourth manner is: The upstream node of the fault point extends a reservation error (ResvErr) message in the existing RSVP message, where the first location information of the fault point is carried in the extended reservation error message and sent to the ingress node. The manner of extending the reservation error message is not limited. For example, a new field may be added to carry the first location information of the fault point; or an existing field may be redefined to carry the first location information of the fault point, and so on. For example, the newly-added field may be, but without being limited to, a TLV field.

Preferably, in this manner, the upstream node of the faulty node may send an extended reservation error message to the ingress node before sending a second reservation tear message to the ingress node, that is, send the first location information of the fault point to the ingress node before the tunnel is torn.

It is hereby pointed out that in this manner, the extending of the reservation error message includes not only what is described above, but also a use direction of a redefined reservation error message. The reservation error message in the prior art is sent along a direction from the ingress node to the egress node, but in this manner in this embodiment, the extended reservation error message not only carries the first location information of the fault point, but also is sent along a direction from the upstream node of the fault point to the ingress node.

The fifth manner is: The upstream node of the fault point extends a path tear message in the existing RSVP message, where the first location information of the fault point is carried in the extended path tear message and sent to the ingress node. The manner of extending the path tear message is not limited. For example, a new field may be added to carry the first location information of the fault point; or an existing field may be redefined to carry the first location information of the fault point, and so on. For example, the newly-added field may be, but without being limited to, a TLV field.

It is hereby pointed out that in this manner, the extending of the path tear message includes not only what is described above, but also a use direction of a redefined path tear message. The path tear message in the prior art is sent along a direction from the ingress node to the egress node, but in this manner in this embodiment, the extended path tear message not only carries the first location information of the fault point, but also is sent along a direction from the upstream node of the fault point to the ingress node.

From a perspective of the manner of carrying the first location information of the fault point, the foregoing has described the manner for the upstream node of the fault point to send the first location information of the fault point to the ingress node.

Based on the above, the ingress node in this embodiment may use, but without being limited to, the following manners to receive the first location information of the fault point sent by the upstream node of the fault point:

the ingress node receives an RSVP Notify message sent by the upstream node of the fault point, where the RSVP Notify message includes the first location information of the fault point, and preferably, the ingress node receives the RSVP Notify message sent by the upstream node of the fault point before receiving the second reservation tear message sent by the upstream node of the fault point; or the ingress node receives a first reservation tear message sent by the upstream node of the fault point, where the first reservation tear message includes the first location information of the fault point; or the ingress node receives a path error message sent by the upstream node of the fault point, where the path error message includes the first location information of the fault point; or the ingress node receives a reservation error message sent by the upstream node of the fault point, where the reservation error message includes the first location information of the fault point; or the ingress node receives a path tear message sent by the upstream node of the fault point, where the path tear message includes the first location information of the fault point.

In an optional implementation manner, at least one node is connected between the ingress node and the upstream node of the fault point. The at least one node here is transit node(s).

Based on this, an optional manner for the upstream node of the fault point to send the first location information of the fault point to the ingress node is: The upstream node of the fault point sends the first location information of the fault point to the ingress node directly. Correspondingly, the manner for the ingress node to receive the first location information of the fault point sent by the upstream node of the fault point is: The ingress node receives the first location information of the fault point that is directly sent by the upstream node of the fault point. The following uses an example to describe this manner with reference to an accompanying drawing. As shown in FIG. 3, "x" indicates a fault point; the upstream node of the fault point is a transit node 23; a transit node 21 and a transit node 22 are connected between the transit node 23 and an ingress node 20; the arc line with an arrow in FIG. 3 shows a path along which the transit node 23 sends the first location information of the fault point to the ingress node 20, that is, the transit node 23 sends the first location information of the fault point to the ingress node 20 directly.

Based on this, an optional manner for the upstream node of the fault point to send the first location information of the fault point to the ingress node is: The upstream node of the fault point sends the first location information of the fault point to the ingress node by using at least one node among at least one node. Correspondingly, the manner for the ingress node to receive the first location information of the fault point sent by the upstream node of the fault point is: The ingress node receives the first location information of the fault point that is sent by the upstream node of the fault point by using the at least one node among the at least one node. The following uses an example to describe this manner with reference to an accompanying drawing. As shown in FIG. 4, "x" indicates a fault point; the upstream node of the fault point is a transit node 23; a transit node 21 and a transit node 22 are connected between the transit node 23 and an ingress node 20; the arrowed arc in FIG. 4 shows a path along which the transit node 23 sends the first location information of the fault point to the ingress node 20, where the transit node 23 first sends the first location information of the fault point to the transit node 21, and then the transit node 21 sends the first location information of the fault point to the ingress node 20, that is, the upstream node of the fault point sends the first location information of the fault point to the ingress node through one hop. For another example, as shown in FIG. 5, "x" indicates a fault point; the upstream node of the fault point is a transit node 23; a transit node 21 and a transit node 22 are connected between the transit node 23 and an ingress node 20; the arrowed arc in FIG. 5 shows the path of the first location information of the fault point sent by the transit node 23 to the ingress node 20, where the transit node 23 first sends the first location information of the fault point to the transit node 22, and then the transit node 22 sends the first location information of the fault point to the transit node 21, and then the transit node 21 sends the first location information of the fault point to the ingress node 20, that is, the upstream node of the fault point sends the first location information of the fault point to the ingress node hop by hop.

It is hereby pointed out that the foregoing two manners are described mainly from a perspective of the transmission path to clarify the manner for the upstream node of the fault point to send the first location information of the fault point to the ingress node. In the two manners, the upstream node of the fault point may carry the location information of the fault point in any manner described above.

Step 202: The ingress node provides the first location information of the fault point to a user so that the user determines a location of the fault point corresponding to a tunnel fault.

An optional implementation manner of step 202 is: The ingress node provides the user with an interface for directly querying location information of the fault point or a similar function. Therefore, after learning the tunnel fault, the user may log in to the ingress node directly and input a query command that carries identification information of the tunnel. Correspondingly, the ingress node receives the query command input by the user, determines location information of the fault point corresponding to the tunnel fault according to the identification information of the tunnel in the query command, and displays the location information of the fault point corresponding to the tunnel fault to the user, and therefore, the user may learn the location of the fault point corresponding to the tunnel fault. Based on this, the user can perform troubleshooting specific to the tunnel fault according to the location of the fault point, thereby improving efficiency of troubleshooting. The identification information of the tunnel may be various types of information that can uniquely identify a tunnel. For example, the identification information of the tunnel may be a four-tuple that can uniquely identify the tunnel throughout the network. The four-tuple includes a destination address of the tunnel, an LSR ID of the ingress node of the tunnel, an ID of the tunnel, and a local LSP ID. For another example, the identification information of the tunnel may be a "tunnel ID" in a four-tuple, or the identification information of the tunnel may be a tunnel name, or the like.

Another optional implementation manner of step 202 is: After obtaining the first location information of the fault point, the ingress node provides the first location information of the fault point to a network management device so that the user determines the location of the fault point corresponding to the tunnel fault by using the network management device. In this way, when the ingress node sends tunnel fault alarm information to the network management device, the network management device may know the location of the fault point corresponding to the tunnel fault alarm information according to the received first location information of the fault point. Then, the network management device may display a determined corresponding relationship between the tunnel fault alarm information and the location information of the fault point to the user so that the user learns the location of the fault point corresponding to the tunnel fault and performs troubleshooting efficiently. In addition, the network management device may also locate a fault cause directly according to the determined location of the fault point, which improves efficiency of troubleshooting specific to the link fault significantly compared with the manner of entire-network troubleshooting.

This embodiment sets no limitation on the manner for the ingress node to provide the first location information of the fault point to the network management device. For example, the ingress node may provide the first location information of the fault point separately to the network management device. Preferably, before or after providing the first location information of the fault point to the network management device, the ingress node may send tunnel fault alarm information to the network management device, so that the network management device learns the tunnel fault and can determine the location of the fault point on a link corresponding to the tunnel fault according to the received first location information of the fault point.

A preferred manner for the ingress node to provide the first location information of the fault point to the network management device is: After receiving the first location information of the fault point, the ingress node generates tunnel fault alarm information that carries the first location information of the fault point, and sends the tunnel fault alarm information to the network management device, so that the user determines the location of the fault point corresponding to the tunnel fault by using the network management device. After receiving the tunnel fault alarm information, the network management device may display the tunnel fault alarm information to the user so that the user may determine a corresponding relationship between the tunnel fault and the location of the fault point. The manner of sending the first location information of the fault point to the network management device through the tunnel fault alarm information is good for reducing interactions between the ingress node and the network management device, saving resources, improving compactness between the tunnel fault alarm information and the location information of the fault point, and improving accuracy of the network management device in determining the location of the fault point on the link.

Another preferred manner for the ingress node to provide the first location information of the fault point to the network management device is: The ingress node receives a location information obtaining request sent by the network management device, and provides the location information of the fault point to the network management device according to the location information obtaining request, so that the user determines the location of the fault point corresponding to the tunnel fault by using the network management device. The location information obtaining request includes identification information of the tunnel. According to the identification information of the tunnel, the ingress node may determine the tunnel, corresponding to which the first location information of the fault point is requested by the network management device.

Optionally, after receiving the location information obtaining request sent by the network management device, the ingress node may send the first location information of the fault point to the network management device, and the network management device displays the first location information to the user over its GUI. In addition, after sending the location information obtaining request to the ingress node, the network management device may display the first location information of the fault point on the ingress node over its interface, so that the user determines the location of the fault point corresponding to the tunnel fault.

Based on the preferred implementation manners, the ingress node may use tunnel fault alarm information to carry a fault cause corresponding to the fault point, so that the network management device can understand the causes of the fault on the link directly. The fault cause corresponding to the fault point here may be: a fault of a node on the link, a fault of a link between two directly connected nodes on the link, or mismatch of configuration information corresponding to the tunnel on two directly connected nodes on the link, or the like.

The following describes an optional implementation manner of the tunnel fault alarm information generated by the ingress node and carrying the first location information of the fault point. The content included in the tunnel fault alarm information is as shown in Table 1.

TABLE 1

| Content in the tunnel fault alarm information | Meaning |
| --- | --- |
| mplsTunnelIndex | Tunnel index |
| mplsTunnelInstance | Tunnel instance number |
| mplsTunnelIngressLSRId | Ingress node identifier of the tunnel |
| mplsTunnelEgressLSRId | Egress node identifier of the tunnel |
| mplsTunnelAdminStatus | Tunnel administration status |
| mplsTunnelOperStatus | Tunnel operation status |
| mplsTunnelFaultyLsrID | LSR ID of an upstream node of the fault point |
| mplsTunnelFaultyInterfaceIP | IP address of an interface on an upstream node of the fault point |
| mplsTunnelDownReason | Tunnel fault cause |

It is hereby pointed out that the tunnel fault alarm information is a result of extending the tunnel fault alarm information defined in RFC3812, and additionally includes an LSR ID of the upstream node of the fault point and an IP address of the interface on the upstream node of the fault point. In addition, the "tunnel fault cause" in Table 1 may be a fault cause of the tunnel or a fault cause corresponding to a newly-extended fault point.

In addition, the tunnel fault alarm information in this embodiment may also be a result of extending private tunnel fault alarm information defined by each vendor.

It can be seen from the above description that, according to the method for sending location information of a fault point provided in this embodiments, after obtaining first location information of a fault point on a link traversed by a tunnel, an ingress node of the tunnel provides the obtained first location information of the fault point to a user or a network management device, so that the user or the network management device can determine a location of the fault point on the link, thereby providing conditions for performing troubleshooting according to the determined location of the fault point and improving efficiency of troubleshooting specific to a tunnel fault.

FIG. 6 is a flowchart of a method for sending location information of a fault point according to another embodiment of the present invention. As shown in FIG. 6, the method in this embodiment includes:

Step 601: A transit node on a tunnel obtains first location information of a fault point on a link traversed by the tunnel, where the first location information of the fault point includes an identifier of the transit node and an identifier of an interface that is connected to the fault point and located on the transit node, where the transit node is an upstream node of the fault point.

In the MPLS tunnel terminology, an initial node of a tunnel is referred to as an ingress node, an end node of the tunnel is referred to as an egress node, and an intermediate node is referred to as a transit node. Correspondingly, in the VPN terminology, an endpoint of a VPN is referred to as a PE node, and an intermediate node of a VPN is referred to as a P node. In fact, the ingress node and the egress node of the tunnel are two endpoints of the VPN borne by the tunnel, that is, the ingress node and the egress node are PE nodes; and the transit node of the tunnel is an intermediate node of the VPN borne by the tunnel, that is, the transit node is a P node. In all embodiments of the present invention, names in the MPLS tunnel terminology are employed.

In an MPLS tunnel, an identifier of each node on the tunnel may be expressed by an LSR ID of the node. Optionally, the identifier of the transit node in this embodiment may be an LSR ID of the transit node. Optionally, the identifier of an interface may be any information that can uniquely identify an interface, such as an IP address, an index number or a name of the interface. Therefore, the identifier of an interface that is connected to the fault point and located on the transit node may also be an IP address, an index number or a name of the interface. Preferably, in the first location information of the fault point, the IP address of the interface may be used as the identifier of the interface.

In this embodiment, faults that occur on the link traversed by the tunnel may include, but without being limited to, the following faults:

(1) A node on the link traversed by the tunnel is faulty, for example, breaks down.

(2) A link between any two directly connected nodes on the link traversed by the tunnel is faulty, for example, the link is cut off.

(3) On any two directly connected nodes on the link traversed by the tunnel, configuration information about the tunnel is mismatched.

(4) Transmission timeout occurs between any two directly connected nodes on the link traversed by the tunnel.

For detailed description about the foregoing fault scenarios, reference may be made to the embodiment shown in FIG. 2, and the details will not be described herein again. However, in this embodiment, only various fault scenarios where the upstream node of the fault point serves as a transit node are described.

In view of the several fault scenarios described above, it can be known that there are different manners for the transit node serving as an upstream node of the fault point to obtain the first location information of the fault point on the link traversed by the tunnel. For example:

when perceiving a fault of a link between the transit node and a downstream node of the transit node or perceiving a fault of the downstream node of the transit node, the transit node serving as an upstream node of the fault point may determine that the fault point is the link between the transit node and the downstream node of the transit node or is the downstream node of the transit node, and may determine that the transit node itself is an upstream node of the fault point, and therefore, obtain an identifier of the transit node itself and an identifier of an interface that is connected to the downstream node of the transit node and located on the transit node, and use the identifiers as the first location information of the fault point; or when perceiving mismatch between configuration information corresponding to the tunnel on the transit node and configuration information corresponding to the tunnel on a downstream node of the transit node, the transit node serving as an upstream node of the fault point may determine that the fault point is the downstream node of the transit node, and may determine that the transit node itself is an upstream node of the fault point, and therefore, obtains an identifier of the transit node itself and an identifier of an interface that is connected to the downstream node of the transit node and located on the transit node, and uses the identifiers as the first location information of the fault point. The configuration information here mainly includes but is not limited to: an IP address configured for an interface traversed by the tunnel (which should match the IP address of the correspondent node), MPLS enabling, TE enabling, and the like. Based on this, mismatch of configuration information in this embodiment includes but is not limited to: mismatch of IP addresses of interfaces on both ends of a link traversed by the tunnel, MPLS is not enabled on at least one of the two interfaces on both ends of the link traversed by the tunnel, and MPLS TE is not enabled on at least one of the two interfaces on both ends of the link traversed by the tunnel.

The manner for the transit node serving as an upstream node of the fault point to perceive the mismatch between configuration information on the transit node and configuration information on the downstream node of the transit node are different may be: The transit node deletes local configuration information, for example, deletes the IP address of the interface traversed by the tunnel, deletes MPLS enabling, deletes MPLS TE enabling, or the like. In addition, when the correspondent node (that is, the downstream node of the transit node) deletes the local configuration, communication will fail between both sides. Therefore, the transit node may also determine mismatch of configuration information between the transit node and its downstream node by perceiving deletion of the local configuration information on the correspondent node in a certain manner. Optionally, the transit node may perceive deletion of the local configuration on its downstream node by perceiving timeout of transmission between the two. However, transmission timeout is not all caused by mismatch of configuration information, but both sides cannot communicate with each other normally, that is, the tunnel is faulty, no matter which cause causes the transmission timeout.

Therefore, when perceiving timeout of transmission between the transit node and the downstream node of the transit node, the transit node serving as an upstream node of the fault point obtains an identifier of the transit node and an identifier of an interface that is connected to the downstream node of the transit node and located on the transit node, and uses the identifiers as the first location information of the fault point. In this manner, the transit node is an upstream node of the fault point. The manner used by the transit node to perceive timeout of transmission between the transit node and the downstream node of the transit node may depend on the device vendor and the application scenario. For example, a hello packet or a packet similar to the hello packet is sent between the transit node and the downstream node of the transit node to keep connection. If the transit node fails to receive the packet within a specified reception time, the transit node may determine timeout of transmission between the transit node and its downstream node, and determine occurrence of a fault.

Step 602: The transit node sends the first location information of the fault point to an ingress node of the tunnel so that the ingress node provides a user with the first location information of the fault point corresponding to a tunnel fault.

After obtaining the first location information of the fault point, the transit node serving as an upstream node of the fault point sends the first location information of the fault point to the ingress node, so that the ingress node can provide the first location information of the fault point to the user after receiving the first location information of the fault point, and the user can determine the location of the fault point corresponding to the tunnel fault and perform troubleshooting specific to the tunnel fault conveniently and efficiently. Manners for the ingress node to provide the first location information of the fault point to the user include: providing, by the ingress node, the user with an interface function for query of the first location information of the fault point, so that the user can log in to the ingress node directly and input a query command; and, displaying, by the ingress node, the first location information of the fault point corresponding to the tunnel fault to the user according to the query command of the user; or, providing, by the ingress node, the location information of the fault point to a network management device, so that the user determines the location information of the fault point corresponding to the tunnel fault by using the network management device. The network management device may, over its interface, display the location information of the fault point and a corresponding relationship between the location information and tunnel fault alarm information corresponding to the fault point to the user, so that the user determines the location of the fault point corresponding to the tunnel fault. After determining the location of the fault point corresponding to the tunnel fault, the user can perform troubleshooting specific to the tunnel fault according to the determined location of the fault point, thereby improving efficiency of troubleshooting.

Optionally, the transit node serving as an upstream node of the fault point may use, but without being limited to, the following manners to send the first location information of the fault point to the ingress node:

the transit node sends an RSVP Notify message to the ingress node, where the RSVP Notify message includes the first location information of the fault point, and preferably, the transit node sends the RSVP Notify message to the ingress node before sending a second reservation tear message to the ingress node; or the transit node sends a first reservation tear message to the ingress node, where the first reservation tear message includes the first location information of the fault point; or the transit node sends a path error message to the ingress node, where the path error message includes the first location information of the fault point; or the transit node sends a reservation error message to the ingress node, where the reservation error message includes the first location information of the fault point; or the transit node sends a path tear message to the ingress node, where the path tear message includes the first location information of the fault point.

From a perspective of the manner of carrying the first location information of the fault point, the foregoing has described the manner for the transit node serving as an upstream node of the fault point to send the first location information of the fault point to the ingress node. For details of such manners, reference may be made to the description in the embodiment shown in FIG. 2 regarding several manners for the upstream node of the fault point to send the first location information of the fault point to the ingress node, and the details will not be described herein again.

In an optional implementation manner, at least one node is connected between the transit node serving as an upstream node of the fault point and the ingress node. The at least one node here is transit node(s).

Based on this, an optional manner for the transit node serving as an upstream node of the fault point to send the first location information of the fault point to the ingress node includes: The transit node sends the first location information of the fault point to the ingress node directly. This manner is shown in FIG. 3.

Based on this, another optional manner for the transit node serving as an upstream node of the fault point to send the first location information of the fault point to the ingress node includes: The transit node sends the first location information of the fault point to the ingress node by using at least one node among at least one node between the transit node and the ingress node. This manner is shown in FIG. 4 and FIG. 5.

It is hereby pointed out that the foregoing two manners are described mainly from a perspective of the transmission path to clarify the manner for the transit node serving as an upstream node of the fault point to send the first location information of the fault point to the ingress node. In the two manners, the manner of carrying the first location information of the fault point may be any manner described above.

In an optional implementation manner, the transit node serving as an upstream node of the fault point may further send second location information of the fault point to a network management device, so as to report a link fault alarm to the network management device and make the network management device perform troubleshooting specific to the link fault. The second location information of the fault point mainly includes information about an interface that is connected to the fault point and located on the transit node serving as an upstream node of the fault point, and the information about the interface mainly includes information such as an identifier of the interface, and an operation status and an administration status of the interface. The identifier of the interface may be an index, a name or an IP address of the interface, or the like. Preferably, in the second location information of the fault point, the index or name of the interface may be used as the identifier of the interface.

An implementation manner for the transit node serving as an upstream node of the fault point to send the second location information of the fault point to the network management device includes: The transit node sends link fault alarm information to the network management device, where the link fault alarm information includes the second location information of the fault point. In this way, after receiving the link fault alarm information sent by the transit node, the network management device may know occurrence of a link fault and the location of the fault point on the link, and then perform troubleshooting specific to the link.

The following describes an optional implementation manner of the link fault alarm information, where the link fault alarm information includes content shown in Table 2.

TABLE 2

| Content in the link fault alarm information | Meaning |
|---|---|
| ifIndex | Interface index |
| ifAdminStatus | Interface administration status |
| ifOperStatus | Interface operation status |
| ifDescr | Interface name |

It can be seen from the above description that, in the method for sending location information of a fault point provided in this embodiment, after receiving first location information of the fault point on a link traversed by a tunnel, a transit node serving as an upstream node of the fault point sends the first location information of the fault point to an ingress node of the tunnel, so that the ingress node can provide the first location information of the fault point to a user or a network management device, thereby providing conditions for determining a location of the fault point corresponding to a tunnel fault and perform troubleshooting specific to the tunnel fault based on the determined location of the fault point, and improving efficiency of troubleshooting specific to the tunnel fault.

FIG. 7 is a flowchart of a method for processing fault alarm information according to an embodiment of the present invention. As shown in FIG. 7, the method in this embodiment includes:

Step 701: A network management device receives tunnel fault alarm information sent by an ingress node of a tunnel, where the tunnel fault alarm information includes first location information of a fault point on a link traversed by the tunnel, and the first location information of the fault point includes an identifier of an upstream node of the fault point and an identifier of an interface that is connected to the fault point and located on the upstream node of the fault point.

Step 702: The network management device determines a location of the fault point corresponding to a tunnel fault according to the first location information of the fault point.

The network management device in this embodiment is mainly used to monitor a network, receive alarm information reported by each node in the network, and perform troubleshooting according to the alarm information. In a VPN network, multiple layers of protocols run on the link. Therefore, when the link is faulty, protocols on all layers will raise alarms, and the network management device receives much alarm information. For every piece of alarm information received, the network management device needs to perform troubleshooting specific to the fault on the layer corresponding to the alarm information.

After the tunnel is torn due to a link fault, the ingress node of the tunnel sends tunnel fault alarm information to the network management device, where the tunnel fault alarm information carries the first location information of the fault point. After receiving the tunnel fault alarm information, the network management device may learn occurrence of the tunnel fault and the need of troubleshooting, and, know the location of the fault point corresponding to the tunnel fault.

Then, the network management device determines the location of the fault point corresponding to the tunnel fault on the link according to the location information of the fault point, and then performs troubleshooting.

In the prior art, after receiving the tunnel fault alarm information sent by the ingress node, the network management device can only learn occurrence of the tunnel fault and the need of troubleshooting, but cannot know the specific location of the fault point corresponding to the tunnel fault on the link. Moreover, before the network management device receives the tunnel fault alarm information, the tunnel is torn. Therefore, the network management device cannot perform troubleshooting by using a forwarding path of the tunnel before the occurrence of the fault, but can only examine the entire network according to information such as network understandings and tunnel configuration requirements, and make repeated attempts to set up a new tunnel. It can be seen that, in the method for processing fault alarm information provided in this embodiment, a network management device obtains first location information of a fault point corresponding to a tunnel fault on a link among the tunnel fault alarm information sent by an ingress node of the tunnel, determines a specific location of the fault point corresponding to the tunnel fault on the link according to the first location information, and then performs troubleshooting specific to the tunnel fault according to the location of the fault point, thereby improving efficiency of troubleshooting specific to the tunnel fault significantly.

Figure 8:
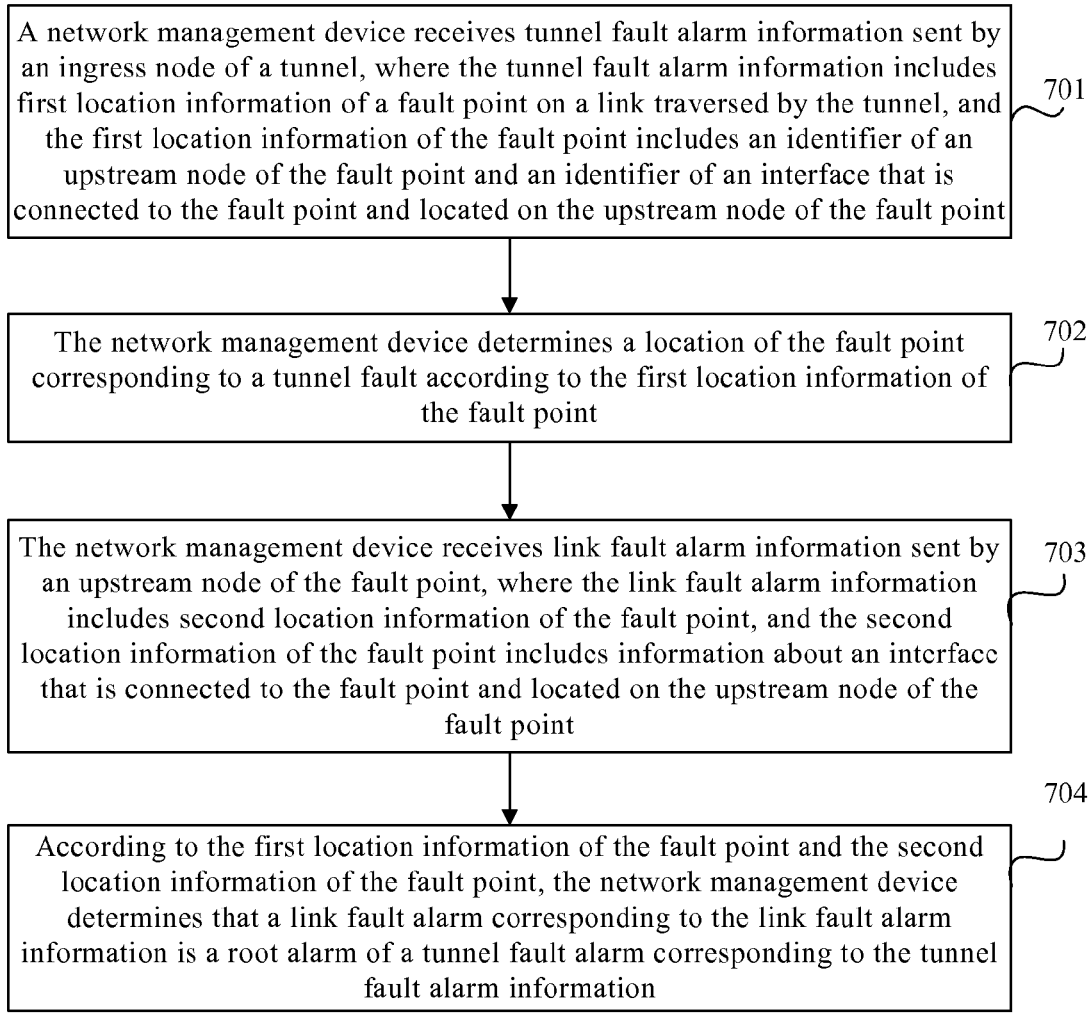
FIG. 8 is a flowchart of a method for sending fault alarm information according to another embodiment of the present invention.

In an optional implementation manner, as shown in FIG. 8, the method in this embodiment further includes:

Step 703: The network management device receives link fault alarm information sent by an upstream node of the fault point, where the link fault alarm information includes second location information of the fault point, and the second location information of the fault point includes information about an interface that is connected to the fault point and located on the upstream node of the fault point.

The information about the interface mainly includes information such as an identifier of the interface, and an operation status and an administration status of the interface. The identifier of the interface may be an index, a name or an IP address of the interface, or the like. Preferably, in the second location information of the fault point, the index or name of the interface may be used as the identifier of the interface.

Step 704: According to the first location information of the fault point and the second location information of the fault point, the network management device determines that a link fault alarm corresponding to the link fault alarm information is a root cause alarm of a tunnel fault alarm corresponding to the tunnel fault alarm information.

Not only the ingress node of the tunnel can discover the tunnel fault and send to the network management device the tunnel fault alarm information that carries the first location information of the fault point corresponding to the tunnel fault, but also the upstream node of the fault point can discover the fault corresponding to the fault point and send to the network management device the link fault alarm information that carries the second location information of the fault point. The process of the upstream node of the fault point sending the link fault alarm information to the network management device is independent of the process of the ingress node sending the tunnel fault alarm information to the network management device. That is, the order between step 703 and steps 701 and 702 is not limited. This embodiment is described through an example where step 703 is performed after steps 701 and 702; however, step 703 may also be performed before step 701.

In this way, after receiving the link fault alarm information sent by the upstream node of the fault point, the network management device learns occurrence of the link fault and the need of troubleshooting, and learns location information of the fault point, and determines the location of the fault point on the link. Subsequently, the network management device performs troubleshooting according to the determined location of the fault point.

Generally, a certain correlation exists between alarms generated by the same node, and a root cause alarm can be distinguished from a derivative alarm according to the correlation between the alarms. If a root cause alarm and a derivative alarm coexist, only the root cause alarm needs to be handled. That is, once the root cause alarm is handled, the derivative alarm is cleared consequently. For example, a link fault (LinkDown) alarm generated by an upstream node of the fault point is a root cause alarm of Interior Gateway Protocol (IGP) fault (Down) alarms and RSVP fault (Down) alarms generated by the node. For example, a tunnel fault alarm generated by an ingress node is a root cause alarm of VPN fault alarms generated by the node.

In addition, a certain relationship also exists between alarms generated by different network elements. For example, causality exists between a link fault alarm generated by an upstream node of the fault point and a tunnel fault alarm generated by an ingress node. However, due to the connectionless feature of the IP network, no effective correlation exists between the link fault alarm generated by the upstream node of the fault point and the tunnel fault alarm generated by the ingress node. In this embodiment, the network management device not only analyzes correlation between different alarms raised by the same node, but also analyzes correlation between alarms raised by different nodes.

In this embodiment, the tunnel fault alarm information sent by the ingress node includes the first location information of the fault point, and the link fault alarm information sent by the upstream node of the fault point includes the second location information of the fault point. Therefore, the network management device in this embodiment can analyze the first location information of the fault point and the second location information of the fault point to correlate the tunnel fault alarm sent by the ingress node with the link fault alarm sent by the upstream node of the fault point and work out the causality between the alarms. Specifically, it is assumed that the first location information of the fault point includes an identifier of an upstream node of a fault point and an IP address of an interface that is connected to the fault point and located on the upstream node of the fault point, and the second location information of the fault point includes information such as an index, a name, an administration status, and an operation status of the interface that is connected to the fault point and located on the upstream node of the fault point. In this case, when the link fault alarm sent by the upstream node of the fault point is received, the identifier of the upstream node of the fault point can be learned. Based on the identifier of the upstream node of the fault point and the identifier of the upstream node of the fault point that is included in the first location information of the fault point, it may be determined that the upstream node of the fault point is the same node. Further, by looking up a preset corresponding relationship between the IP address of the interface and the name and index of the interface (for example, the corresponding relationship may be pre-stored in a database), it may be determined that the IP address of the interface that is connected to the fault point and located on the upstream node of the fault point corresponds to the same interface as the index name of the interface that is connected to the fault point and located on the upstream node of the fault point. Therefore, it is determined that the fault point corresponding to the link fault alarm raised by the upstream node of the fault point is the same as the fault point corresponding to the tunnel fault alarm raised by the ingress node, and, in practical troubleshooting, the troubleshooting is specific to this fault point. Therefore, the network management device may determine that the link fault alarm raised by the upstream node of the fault point is a root cause alarm of the tunnel fault alarm raised by the ingress node, and that the tunnel fault alarm raised by the ingress node is a derivative alarm of the link fault alarm raised by the upstream node of the fault point. In this way, troubleshooting is required only for the link fault alarm raised by the upstream node of the fault point. Once the link fault alarm is cleared, the tunnel fault alarm raised by the ingress node is cleared consequently.

As analyzed above, the network management device works out causality between fault alarms raised by network elements. In troubleshooting, the troubleshooting is required only for the root cause alarm. Once the root cause alarm is cleared, other derivative alarms are cleared consequently, which can relieve the burden of the network management device.

In an optional implementation manner of this embodiment, the tunnel fault alarm information sent by the ingress node further includes a fault cause corresponding to the fault point. Based on this, the network management device can further obtain the fault cause corresponding to the fault point from the tunnel fault alarm information. Optionally, that the network management device determines, according to the first location information of the fault point and the second location information of the fault point, that the link fault alarm corresponding to the link fault alarm information is a root cause alarm of the tunnel fault alarm corresponding to the tunnel fault alarm information, includes: according to the first location information of the fault point, the second location information of the fault point, and the fault cause corresponding to the fault point, the network management device determines that the link fault alarm corresponding to the link fault alarm information is a root cause alarm of the tunnel fault alarm corresponding to the tunnel fault alarm information. In this way, the network management device can determine the relationship between the link fault alarm raised by the upstream node of the fault point and the tunnel fault alarm raised by the ingress node more quickly.

Considering that in a practical network, multiple (assuming N) tunnels may "traverse" a node, and one tunnel may bear multiple (assuming M) VPN services, M×N alarms may be analyzed and determined as derivative alarms of a link fault alarm, and a network maintenance engineer needs to handle only one alarm instead of the M×N alarms, which facilitates network maintenance significantly.

Figure 9:
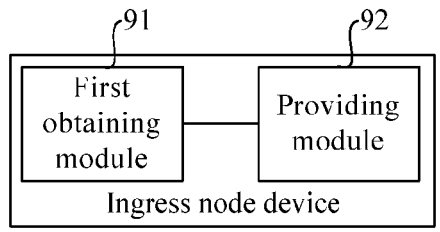
FIG. 9 is a schematic structural diagram of an ingress node device according to an embodiment of the present invention.

FIG. 9 is a schematic structural diagram of an ingress node device according to an embodiment of the present invention. The ingress node device in this embodiment is an ingress node of a tunnel, and may be a PE device. As shown in FIG. 9, the ingress node device in this embodiment includes a first obtaining module 91 and a providing module 92.

The first obtaining module 91 is configured to obtain first location information of a fault point on a link traversed by a tunnel where the ingress node device is located in this embodiment, where the first location information of the fault point includes an identifier of an upstream node of the fault point and an identifier of an interface that is connected to the fault point and located on the upstream node of the fault point.

The providing module 92 is connected to the first obtaining module 91 and is configured to provide the user with the first location information of the fault point that is obtained by the first obtaining module 91, so that the user determines a location of the fault point corresponding to a tunnel fault.

In an optional implementation manner, the first obtaining module 91 may use, but without being limited to, the following manners to obtain the location information of the fault point:

the first obtaining module 91 is specifically configured to: when perceiving a fault of a link between the ingress node device in this embodiment and a downstream node of the ingress node device or perceiving a fault of the downstream node of the ingress node device in this embodiment, obtain an identifier of the ingress node device in this embodiment and an identifier of an interface that is connected to the downstream node and located on the ingress node device in this embodiment, and use the identifiers as the first location information of the fault point, where the ingress node device in this embodiment is an upstream node of the fault point; or the first obtaining module 91 is specifically configured to: when perceiving mismatch between configuration information corresponding to the tunnel on the ingress node device in this embodiment and configuration information corresponding to the tunnel on a downstream node of the ingress node device in this embodiment, obtain an identifier of the ingress node device in this embodiment and an identifier of an interface that is connected to the downstream node of the ingress node device in this embodiment and located on the ingress node device in this embodiment, and use the identifiers as the first location information of the fault point, where the ingress node device in this embodiment is an upstream node of the fault point; or the first obtaining module 91 is specifically configured to: when perceiving timeout of transmission between the ingress node device in this embodiment and a downstream node of the ingress node device in this embodiment, obtain an identifier of the ingress node device in this embodiment and an identifier of an interface that is connected to the downstream node of the ingress node device in this embodiment and located on the ingress node device in this embodiment, and use the identifiers as the first location information of the fault point, where the ingress node device in this embodiment is an upstream node of the fault point; or the first obtaining module 91 is specifically configured to receive the first location information of the fault point sent by the upstream node of the fault point.

Optionally, the first obtaining module 91 being specifically configured to receive the first location information of the fault point sent by the upstream node of the fault point includes:

the first obtaining module 91 being specifically configured to receive a resource reservation protocol notify message sent by the upstream node of the fault point, where, the resource reservation protocol Notify message includes the first location information of the fault point, and preferably, the first obtaining module 91 being specifically configured to receive the Resource Reservation Protocol Notify message sent by the upstream node of the fault point before receiving a second reservation tear message sent by the upstream node of the fault point; or the first obtaining module 91 being specifically configured to receive a first reservation tear message sent by the upstream node of the fault point, where the first reservation tear message includes the first location information of the fault point; or the first obtaining module 91 being specifically configured to receive a path error message sent by the upstream node of the fault point, where the path error message includes the first location information of the fault point; or the first obtaining module 91 being specifically configured to receive a reservation error message sent by the upstream node of the fault point, where the reservation error message includes the first location information of the fault point; or the first obtaining module 91 being specifically configured to receive a path tear message sent by the upstream node of the fault point, where the path tear message includes the first location information of the fault point.

In an optional implementation manner, at least one node is connected between the ingress node device in this embodiment and the upstream node of the fault point. Based on this, the first obtaining module 91 being specifically configured to receive the first location information of the fault point sent by the upstream node of the fault point includes: the first obtaining module 91 being specifically configured to receive the first location information of the fault point that is directly sent by the upstream node of the fault point; or, the first obtaining module 91 being specifically configured to receive the first location information of the fault point that is sent by the upstream node of the fault point by using at least one node among the at least one node.

In an optional implementation manner, the providing module 92 is specifically configured to provide the first location information of the fault point to a network management device, so that the user determines a location of the fault point corresponding to the tunnel fault by using the network management device; or the providing module 92 is specifically configured to receive a query command input by the user, and display the first location information of the fault point to the user according to the query command, so that the user determines the location of the fault point corresponding to the tunnel fault, where the query command includes identification information of the tunnel.

Optionally, the providing module 92 being specifically configured to provide the first location information of the fault point to a network management device so that the user determines a location of the fault point corresponding to the tunnel fault by using the network management device, includes:

the providing module 92 being specifically configured to: generate tunnel fault alarm information that carries the first location information of the fault point, and send the tunnel fault alarm information to the network management device so that the user determines the location of the fault point corresponding to the tunnel fault by using the network management device; or the providing module 92 being specifically configured to: receive a location information obtaining request sent by the network management device, and provide the first location information of the fault point to the network management device according to the location information obtaining request, so that the user determines the location of the fault point corresponding to the tunnel fault by using the network management device, where the location information obtaining request includes identification information of the tunnel.

Optionally, the providing module 92 is further configured to add a fault cause corresponding to the fault point into the tunnel fault alarm information and send it to the network management device.

Function modules of the ingress node device provided in this embodiment may be used to perform corresponding processes in the method for sending location information of a fault point shown in FIG. 2. Their working principles will not be described in detail herein again, and reference may be made to the description in the method embodiments.

According to the ingress node device provided in this embodiment, after obtaining first location information of a fault point on a link traversed by a tunnel where the ingress node device is located, the ingress node device provides the obtained first location information of the fault point to a user, so that the user can determine a location of the fault point corresponding to a tunnel fault, thereby providing conditions for performing troubleshooting according to the determined location of the fault point and improving efficiency of troubleshooting specific to the tunnel fault.

Figure 10:
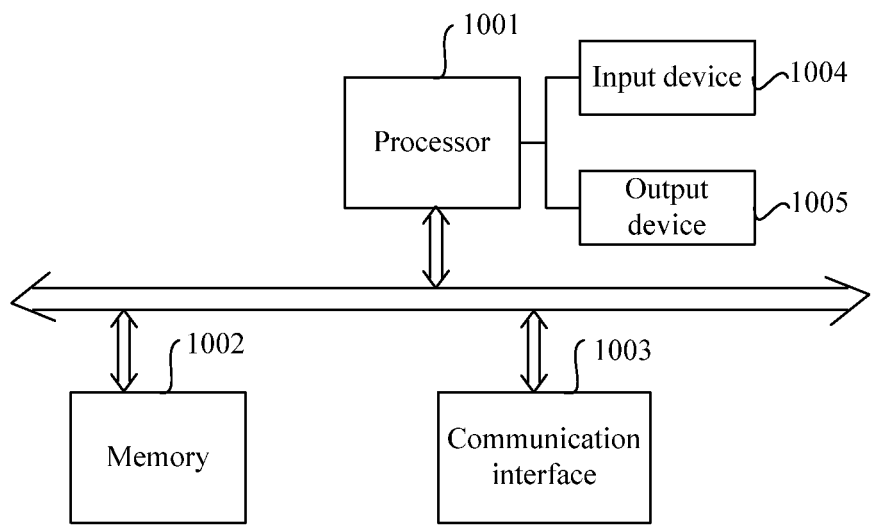
FIG. 10 is a schematic structural diagram of an ingress node device according to another embodiment of the present invention.

FIG. 10 is a schematic structural diagram of an ingress node device according to another embodiment of the present invention. As shown in FIG. 10, the ingress node device in this embodiment includes at least one processor 1001 and a memory 1002. The memory 1002 is configured to store executable program codes; and the processor 1001 reads the executable program codes stored in the memory 1002 to run a program corresponding to the executable program codes, so as to:

obtain first location information of a fault point on a link traversed by the tunnel where the ingress node device is located in this embodiment, where the first location information of the fault point includes an identifier of an upstream node of the fault point and an identifier of an interface that is connected to the fault point and located on the upstream node of the fault point; and provide the first location information of the fault point to a user so that the user determines a location of the fault point corresponding to a tunnel fault.

Optionally, the ingress node device in this embodiment may further include a communication interface 1003 and an output device 1005. The processor 1001, the memory 1002, and the communication interface 1003 are interconnected over buses, and the output device 1005 is connected to the processor 1001. The bus may be an Industry Standard Architecture (ISA) bus, a Peripheral Component Interconnect (PCI) bus, or an Extended Industry Standard Architecture (EISA) bus, or the like. The bus is categorized into an address bus, a data bus, a control bus, and the like. For ease of illustration in FIG. 10, only one bold line is used to represent the bus, but it does not mean that there is only one bus or only one type of bus.

Optionally, over the communication interface 1003, the processor 1001 may obtain the first location information of the fault point from another device communicatively connected to the processor. For example, the communication interface 1003 receives the first location information of the fault point sent by the downstream node of the ingress node device in this embodiment, and then transmits the first location information to the processor 1001 over the bus.

Optionally, the processor 1001 may provide the first location information of the fault point to the user by using the output device 1005. For example, the output device may be implemented as a display, and the processor 1001 may use the display of the device to provide the first location information of the fault point to the user. Alternatively, over the communication interface 1003, the processor 1001 may transmit the first location information of the fault point to another device communicatively connected to the processor (in this embodiment, may be an access point device or a network management device on the link), and the another device provides the first location information to the user.

In addition, optionally, the embodiment of the present invention may further include an input device 1004 corresponding to the output device 1005, and the input device may be specifically implemented as a keyboard, a mouse, a screen (handwriting screen, keypad screen, or the like), or a voice-based input device, or the like.

The ingress node device provided in this embodiment may be used to perform corresponding processes in the method for sending location information of a fault point shown in FIG. 2. Their working principles will not be described in detail herein again, and reference may be made to the description in the method embodiments.

According to the ingress node device provided in this embodiment, after obtaining first location information of a fault point on a link traversed by a tunnel where the ingress node device is located, the ingress node device provides the obtained first location information of the fault point to a user, so that the user can determine a location of the fault point corresponding to a tunnel fault, thereby providing conditions for performing troubleshooting according to the determined location of the fault point and improving efficiency of troubleshooting specific to the tunnel fault.

Figure 11:
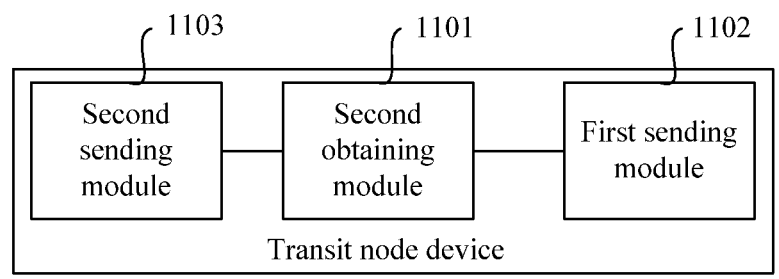
FIG. 11 is a schematic structural diagram of a transit node device according to an embodiment of the present invention.

FIG. 11 is a schematic structural diagram of a transit node device according to an embodiment of the present invention. The transit node device in this embodiment is a transit node of a tunnel, and may be a P device. As shown in FIG. 11, the transit node device in this embodiment includes a second obtaining module 1101 and a first sending module 1102.

The second obtaining module 1101 is configured to obtain first location information of a fault point on a link traversed by a tunnel where the transit node device is located in this embodiment, where the first location information of the fault point includes an identifier of the transit node device in this embodiment and an identifier of an interface that is connected to the fault point and located on the transit node device in this embodiment, where the transit node device in this embodiment is an upstream node of the fault point.

The first sending module 1102 is connected to the second obtaining module 1101, and is configured to send the first location information of the fault point, which is obtained by the second obtaining module 1101, to an ingress node of the tunnel so that the ingress node provides a user with the first location information of the fault point corresponding to a tunnel fault.

In an optional implementation manner, the second obtaining module 1101 may use, but without being limited to, the following manners to obtain the first location information of the fault point on the link traversed by the tunnel where the transit node device is located in this embodiment:

the second obtaining module 1101 is specifically configured to: when perceiving a fault of a link between the transit node device in this embodiment and a downstream node of the transit node device or perceiving a fault of the downstream node of the transit node device in this embodiment, obtain an identifier of the transit node device in this embodiment and an identifier of an interface that is connected to the downstream node of the transit node device in this embodiment and located on the transit node device in this embodiment, and use the identifiers as the first location information of the fault point; or the second obtaining module 1101 is specifically configured to: when perceiving mismatch between configuration information corresponding to the tunnel on the transit node device in this embodiment and configuration information corresponding to the tunnel on a downstream node of the transit node device in this embodiment, obtain an identifier of the transit node device in this embodiment and an identifier of an interface that is connected to the downstream node of the transit node device in this embodiment and located on the transit node device in this embodiment, and use the identifiers as the first location information of the fault point; or the second obtaining module 1101 is specifically configured to: when perceiving timeout of transmission between the transit node device in this embodiment and a downstream node of the transit node device in this embodiment, obtain an identifier of the transit node device in this embodiment and an identifier of an interface that is connected to the downstream node of the transit node device in this embodiment and located on the transit node device in this embodiment, and use the identifiers as the first location information of the fault point.

In an optional implementation manner, the first sending module 1102 may use, but without being limited to, the following manners to send the first location information of the fault point to the ingress node:

the first sending module 1102 is specifically configured to send a resource reservation protocol notify message to the ingress node, where the resource reservation protocol notify message includes the first location information of the fault point, and preferably, the first sending module 1102 is specifically configured to send the resource reservation protocol notify message to the ingress node before sending a second reservation tear message to the ingress node; or the first sending module 1102 is specifically configured to send a first reservation tear message to the ingress node, where the first reservation tear message includes the first location information of the fault point; or the first sending module 1102 is specifically configured to send a path error message to the ingress node, where the path error message includes the first location information of the fault point; or the first sending module 1102 is specifically configured to send a reservation error message to the ingress node, where the reservation error message includes the first location information of the fault point; or the first sending module 1102 is specifically configured to send a path tear message to the ingress node, where the path tear message includes the first location information of the fault point.

In an optional implementation manner, at least one node is connected between the transit node device in this embodiment and the ingress node. Therefore, manners for the first sending module 1102 to send the first location information of the fault point to the ingress node include: the first sending module 1102 being specifically configured to send the first location information of the fault point to the ingress node directly; or, the first sending module 1102 being specifically configured to send the first location information of the fault point to the ingress node by using at least one node among the at least one node.

In an optional implementation manner, as shown in FIG. 11, the transit node device in this embodiment further includes a second sending module 1103. The second sending module 1103 is configured to send second location information of the fault point to a network management device, where the second location information of the fault point includes information about an interface that is connected to the fault point and located on the transit node device in this embodiment. Optionally, the second sending module 1103 is connected to the second obtaining module 1101, and is configured to obtain the second location information of the fault point from the second obtaining module 1101.

Optionally, the second sending module 1103 is specifically configured to send link fault alarm information to the network management device, where the link fault alarm information includes the second location information of the fault point.

Function modules of the transit node device provided in this embodiment may be used to perform corresponding processes in the method for sending location information of a fault point shown in FIG. 6. Their working principles will not be described in detail herein again, and reference may be made to the description in the method embodiments.

According to the transit node device provided in this embodiment, after obtaining first location information of a fault point on a link traversed by a tunnel where the transit node device is located, the transit node device sends the first location information of the fault point to an ingress node of the tunnel, so that the ingress node can provide the location information of the fault point to a user and the user can determine a location of the fault point corresponding to a tunnel fault and perform troubleshooting based on the determined location of the fault point, thereby improving efficiency of troubleshooting specific to the tunnel fault.

Figure 12:
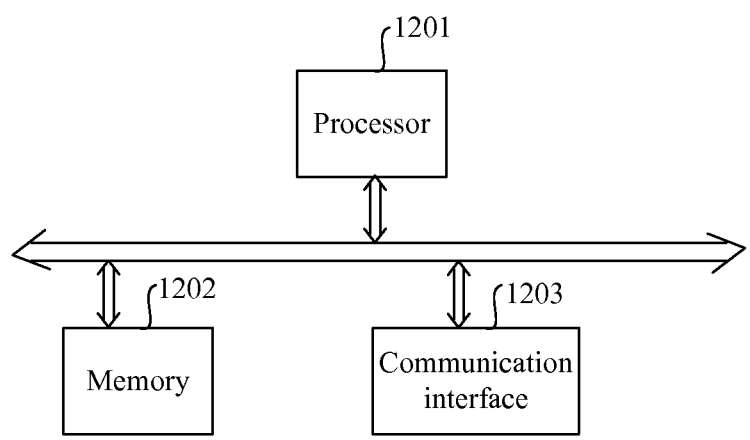
FIG. 12 is a schematic structural diagram of a transit node device according to another embodiment of the present invention.

FIG. 12 is a schematic structural diagram of a transit node device according to another embodiment of the present invention. As shown in FIG. 12, the transit node device in this embodiment includes a processor 1201, a memory 1202, and a communication interface 1203. The processor 1201, the memory 1202, and the communication interface 1203 are interconnected over buses. The bus may be an ISA bus, a PCI bus, or an EISA bus, or the like. The bus is categorized into an address bus, a data bus, a control bus, and the like. For ease of illustration in FIG. 12, only one bold line is used to represent the bus, but it does not mean that there is only one bus or only one type of bus.

The memory 1202 is configured to store a program to be run by the processor.

The processor 1201 is configured to obtain the program from the memory to obtain first location information of a fault point on a link traversed by the tunnel where the transit node device is located in this embodiment, where the first location information of the fault point includes an identifier of the transit node device and an identifier of an interface that is connected to the fault point and located on the transit node device, where the transit node device is an upstream node of the fault point.

The communication interface 1203 is configured to send the first location information of the fault point, which is obtained by the processor 1201, to an ingress node of the tunnel so that the ingress node provides a user with the first location information of the fault point corresponding to a tunnel fault.

Optionally, the memory 1202 may be further configured to store the first location information of the fault point that is obtained by the processor 1201. For example, after obtaining the first location information of the fault point, the processor 1201 may store the first location information of the fault point into the memory 1202 over a bus connected to the memory 1202.

Optionally, over a communication interface 1203, the processor 1201 may obtain the first location information of the fault point from another device communicatively connected to the processor. For example, the communication interface 1203 may receive the first location information of the fault point sent by a downstream node of the transit node device in this embodiment, and send the first location information of the fault point to the processor 1201 over the bus connected to the processor 1201 (such as a data bus).

Optionally, after the processor 1201 obtains the first location information of the fault point, over a bus connected to the communication interface 1203, the communication interface 1203 may send the first location information of the fault point to another device communicatively connected to the device. The transit node device provided in this embodiment may be used to perform corresponding processes in the method for sending location information of a fault point shown in FIG. 6. Their working principles will not be described in detail herein again, and reference may be made to the description in the method embodiments.

According to the transit node device provided in this embodiment, after obtaining first location information of a fault point on a link traversed by a tunnel where the transit node device is located, the transit node device sends the first location information of the fault point to an ingress node of the tunnel, so that the ingress node can provide the location information of the fault point to a user and the user can determine a location of the fault point corresponding to a tunnel fault and perform troubleshooting based on the determined location of the fault point, thereby improving efficiency of troubleshooting specific to the tunnel fault.

Figure 13:
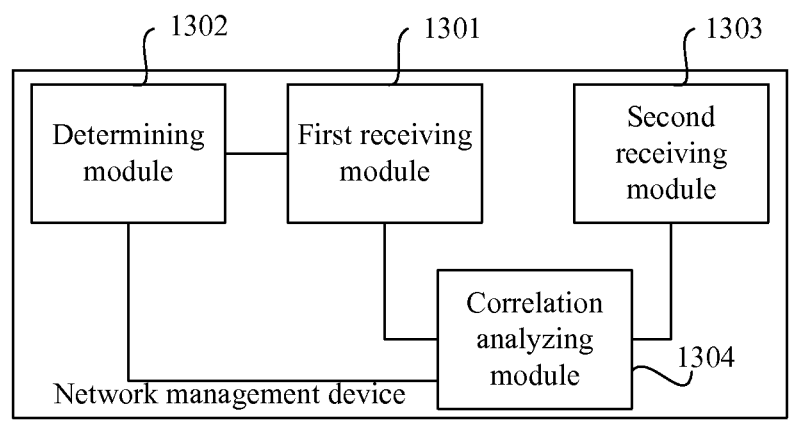
FIG. 13 is a schematic structural diagram of a network management device according to an embodiment of the present invention.

FIG. 13 is a schematic structural diagram of a network management device according to an embodiment of the present invention. As shown in FIG. 13, the network management device in this embodiment includes a first receiving module 1301 and a determining module 1302.

The first receiving module 1301 is configured to receive tunnel fault alarm information sent by an ingress node of a tunnel, where the tunnel fault alarm information includes first location information of a fault point on a link traversed by the tunnel, and the first location information of the fault point includes an identifier of an upstream node of the fault point and an identifier of an interface that is connected to the fault point and located on the upstream node of the fault point.

The determining module 1302 is connected to the first receiving module 1301 and is configured to determine a location of the fault point corresponding to a tunnel fault according to the first location information of the fault point that is received by the first receiving module 1301.

In an optional implementation manner, as shown in FIG. 13, the network management device in this embodiment further includes a second receiving module 1303 and a correlation analyzing module 1304.

The second receiving module 1303 is configured to: receive link fault alarm information sent by an upstream node of the fault point, where the link fault alarm information includes second location information of the fault point, and the second location information of the fault point includes information about an interface that is connected to the fault point and located on the upstream node of the fault point.

The correlation analyzing module 1304 is connected to the first receiving module 1301 and the second receiving module 1303, and is configured to: according to the first location information of the fault point that is received by the first receiving module 1301 and the second location information of the fault point that is received by the second receiving module 1303, determine that a link fault alarm corresponding to the link fault alarm information received by the second receiving module 1303 is a root cause alarm of a tunnel fault alarm corresponding to the tunnel fault alarm information received by the first receiving module 1301.

In an optional implementation manner, the tunnel fault alarm information further includes a fault cause corresponding to the fault point. Based on this, the determining module 1302 is further configured to obtain the fault cause corresponding to the fault point from the tunnel fault alarm information. Therefore, the correlation analyzing module 1304 is specifically configured to: according to the first location information of the fault point, the second location information of the fault point, and the fault cause corresponding to the fault point, determine that the link fault alarm corresponding to the link fault alarm information is a root cause alarm of the tunnel fault alarm corresponding to the tunnel fault alarm information. Optionally, the determining module 1302 is further connected to the correlation analyzing module 1304.

Function modules of the network management device provided in this embodiment may be used to perform corresponding processes in the method for processing fault alarm information shown in FIG. 7 or FIG. 8. Their working principles will not be described in detail herein again, and reference may be made to the description in the method embodiments.

The network management device provided in this embodiment obtains first location information of a fault point on a link traversed by a tunnel among tunnel fault alarm information sent by an ingress node of the tunnel, and determines a location of the fault point corresponding to a tunnel fault according to the location information, thereby providing conditions for performing troubleshooting according to the location of the fault point and improving efficiency of troubleshooting specific to the tunnel fault.

Figure 14:
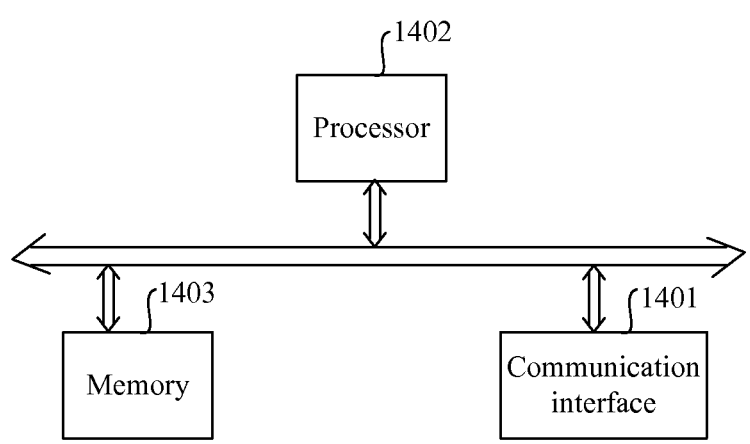
FIG. 14 is a schematic structural diagram of a network management device according to another embodiment of the present invention.

FIG. 14 is a schematic structural diagram of a network management device according to another embodiment of the present invention. As shown in FIG. 14, the network management device in this embodiment includes a memory 1403, a communication interface 1401, and a processor 1402. The three are connected over a bus, and the bus may be an ISA bus, a PCI bus, or an EISA bus, or the like. The bus is categorized into an address bus, a data bus, a control bus, and the like. For ease of illustration in FIG. 14, only one bold line is used to represent the bus, but it does not mean that there is only one bus or only one type of bus.

The communication interface 1401 is configured to receive tunnel fault alarm information sent by an ingress node of a tunnel, where the tunnel fault alarm information includes first location information of a fault point on a link traversed by the tunnel, and the first location information of the fault point includes an identifier of an upstream node of the fault point and an identifier of an interface that is connected to the fault point and located on the upstream node of the fault point.

The processor 1402 is configured to determine a location of the fault point corresponding to a tunnel fault according to the first location information of the fault point that is received by the communication interface 1401.

The memory 1403 is configured to store the tunnel fault alarm information and the first location information of the fault point that are received by the communication interface 1401, and a program that need to be run by the processor 1402. For example, after receiving the tunnel fault alarm information, the communication interface 1401 may store the tunnel fault alarm information and the first location information of the fault point into the memory 1403 over a bus connected to the memory 1403.

Optionally, the communication interface 1401 in the embodiment of the present invention may be further configured to send a message to another device connected to the network management device in this embodiment when necessary.

The network management device provided in this embodiment may be used to perform corresponding processes in the method for processing fault alarm information shown in FIG. 7 or FIG. 8. Their working principles will not be described in detail herein again, and reference may be made to the description in the method embodiments.

It should be noted that the communication interface mentioned in the foregoing embodiment (1003 in FIG. 10, 1203 in FIGS. 12, and 1401 in FIG. 14) may be a stand-alone physical structure capable of communicating with other devices, such as a computer network adapter or an antenna, or definitely may be multiple separated physical structures, for example, one stand-alone antenna for the function of receiving information, and other antennas for the function of transmitting information.

The network management device provided in this embodiment obtains first location information of a fault point on a link traversed by a tunnel among tunnel fault alarm information sent by an ingress node of the tunnel, and determines a location of the fault point corresponding to a tunnel fault according to the location information, thereby providing conditions for performing troubleshooting according to the location of the fault point and improving efficiency of troubleshooting specific to the tunnel fault.

It should be noted that the described apparatus embodiments are merely exemplary, the units described as separate parts may be physically separated or not, and parts displayed as units may be physical units or not, that is, may be placed in one location or distributed on a plurality of network elements. Part of or all of the modules may be selected according to actual needs to achieve the objectives of the solutions of the embodiments. A person of ordinary skill in the art may understand and implement the embodiments without making creative efforts.

According to the descriptions of the foregoing implementation manners, persons skilled in the art can clearly understand that the present invention can be implemented by software in addition to necessary universal hardware, or by dedicated hardware including dedicated integrated circuits, dedicated CPUs, dedicated memories, and dedicated components, but, in most circumstances, the former is preferred. Based on such understandings, the essence of the technical solutions of the present invention or the part that makes contributions to the prior art can be embodied in a software product. The computer software product may be stored in a readable storage medium such as a computer floppy disk, a USB flash disk, a mobile hard disk, a read-only memory (ROM), a random access memory (RAM), a magnetic disk, or an optical disk, where the storage medium incorporates several instructions causing a computer device (such as a personal computer, a server, or a network device) to perform the method specified in each embodiment of the present invention.

The embodiments in this specification are all described in a progressive manner, mutual reference may be made to the same or similar part of the embodiments, and each embodiment focuses on differences from other embodiments. In particular, the apparatus and system embodiments are basically similar to the method embodiment and are therefore described briefly, and reference may be made to the corresponding part in the description of the method embodiment.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending location information of a fault point, comprising:
obtaining, by an ingress node of a tunnel, first location information of the fault point on a link traversed by the tunnel, wherein the first location information of the fault point comprises an identifier of an upstream node of the fault point and an identifier of an interface that is connected to the fault point and located on the upstream node of the fault point; and providing, by the ingress node, the first location information of the fault point to a user so that the user determines a location of the fault point corresponding to a tunnel fault, wherein the obtaining, by the ingress node of the tunnel, first location information of the fault point on the link traversed by the tunnel, comprises at least one item of the items (a)-(d):

(a) when the ingress node perceives a fault of a link between the ingress node and a downstream node of the ingress node or perceives a fault of the downstream node of the ingress node, obtaining an identifier of the ingress node and an identifier of an interface that is connected to the downstream node of the ingress node and located on the ingress node, and using these identifiers as the first location information of the fault point, wherein the ingress node is the upstream node of the fault point;

(b) when the ingress node perceives mismatch between configuration information corresponding to the tunnel on the ingress node and configuration information corresponding to the tunnel on a downstream node of the ingress node, obtaining an identifier of the ingress node and an identifier of an interface that is connected to the downstream node of the ingress node and located on the ingress node, and using these identifiers as the first location information of the fault point, wherein the ingress node is the upstream node of the fault point;

(c) when the ingress node perceives timeout of transmission between the ingress node and the downstream node of the ingress node, obtaining the identifier of the ingress node and the identifier of the interface that is connected to the downstream node of the ingress node and located on the ingress node, and using these identifiers as the first location information of the fault point, wherein the ingress node is the upstream node of the fault point; and (d) receiving, by the ingress node, the first location information of the fault point sent by the upstream node of the fault point.

2. The method for sending location information of the fault point according to claim 1, wherein the receiving, by the ingress node, the first location information of the fault point sent by the upstream node of the fault point, comprises at least one step of the five steps:

receiving, by the ingress node, a resource reservation protocol notify message sent by the upstream node of the fault point, wherein the resource reservation protocol notify message comprises the first location information of the fault point;

receiving, by the ingress node, a first reservation tear message sent by the upstream node of the fault point, wherein the first reservation tear message comprises the first location information of the fault point;

receiving, by the ingress node, a path error message sent by the upstream node of the fault point, wherein the path error message comprises the first location information of the fault point;

receiving, by the ingress node, a reservation error message sent by the upstream node of the fault point, wherein the reservation error message comprises the first location information of the fault point; and receiving, by the ingress node, a path tear message sent by the upstream node of the fault point, wherein the path tear message comprises the first location information of the fault point.

3. The method for sending location information of the fault point according to claim 2, wherein the receiving, by the ingress node, the resource reservation protocol notify message sent by the upstream node of the fault point, comprises:

receiving, by the ingress node, the resource reservation protocol notify message sent by the upstream node of the fault point before receiving a second reservation tear message sent by the upstream node of the fault point.

4. The method for sending location information of the fault point according to claim 1, wherein at least one node is connected between the ingress node and the upstream node of the fault point; and the receiving, by the ingress node, the first location information of the fault point sent by the upstream node of the fault point, comprises at least one step of the two steps:

receiving, by the ingress node, the first location information of the fault point directly sent by the upstream node of the fault point; and receiving, by the ingress node, the first location information of the fault point sent by the upstream node of the fault point by using at least one node among the at least one node.

5. The method for sending location information of the fault point according to claim 1, wherein the providing, by the ingress node, the first location information of the fault point to the user so that the user determines the location of the fault point corresponding to the tunnel fault, comprises at least one item of the items (a) and (b):

(a) providing, by the ingress node, the first location information of the fault point to a network management device so that the user determines the location of the fault point corresponding to the tunnel fault by using the network management device; and (b) receiving, by the ingress node, a query command input by the user, and displaying the first location information of the fault point to the user according to the query command, so that the user determines the location of the fault point corresponding to the tunnel fault, wherein the query command comprises identification information of the tunnel.

6. The method for sending location information of the fault point according to claim 5, wherein the providing, by the ingress node, the first location information of the fault point to the network management device so that the user determines the location of the fault point corresponding to the tunnel fault by using the network management device, comprises at least one item of the two items (a) and (b):

(a) generating, by the ingress node, tunnel fault alarm information that carries the first location information of the fault point; sending, by the ingress node, the tunnel fault alarm information to the network management device so that the user determines the location of the fault point corresponding to the tunnel fault by using the network management device; and (b) receiving, by the ingress node, a location information obtaining request sent by the network management device, wherein the location information obtaining request carries identification information of the tunnel; providing, by the ingress node, the first location information of the fault point to the network management device according to the location information obtaining request so that the user determines the location of the fault point corresponding to the tunnel fault by using the network management device.

7. The method for sending location information of the fault point according to claim 6, further comprising:
adding, by the ingress node, a fault cause corresponding to the fault point into the tunnel fault alarm information.

8. A method for sending location information of a fault point, comprising:
obtaining, by a transit node on a tunnel, first location information of the fault point on a link traversed by the tunnel, wherein the first location information of the fault point comprises an identifier of the transit node and an identifier of an interface that is connected to the fault point and located on the transit node, wherein the transit node is an upstream node of the fault point; and
sending, by the transit node, the first location information of the fault point to an ingress node of the tunnel so that the ingress node provides a user with the first location information of the fault point corresponding to a tunnel fault,
wherein the obtaining, by the transit node on the tunnel, first location information of the fault point on the link traversed by the tunnel, comprises at least one item of the items (a)-(c):
(a) when the transit node perceives a fault of a link between the transit node and a downstream node of the transit node or perceives a fault of the downstream node of the transit node, obtaining the identifier of the transit node and an identifier of an interface that is connected to the downstream node of the transit node and located on the transit node, and using these identifiers as the first location information of the fault point;
(b) when the transit node perceives mismatch between configuration information corresponding to the tunnel on the transit node and configuration information corresponding to the tunnel on a downstream node of the transit node, obtaining the identifier of the transit node and an identifier of an interface that is connected to the downstream node of the transit node and located on the transit node, and using these identifiers as the first location information of the fault point; and
(c) when the transit node perceives timeout of transmission between the transit node and a downstream node of the transit node, obtaining the identifier of the transit node and an identifier of an interface that is connected to the downstream node of the transit node and located on the transit node, and using these identifiers as the first location information of the fault point.

9. The method for sending location information of the fault point according to claim 8, wherein the sending, by the transit node, the first location information of the fault point to the ingress node of the tunnel, comprises at least one step of the five steps:
sending, by the transit node, a resource reservation protocol notify message to the ingress node, wherein the resource reservation protocol notify message comprises the first location information of the fault point;
sending, by the transit node, a first reservation tear message to the ingress node, wherein the first reservation tear message comprises the first location information of the fault point;
sending, by the transit node, a path error message to the ingress node, wherein the path error message comprises the first location information of the fault point;
sending, by the transit node, a reservation error message to the ingress node, wherein the reservation error message comprises the first location information of the fault point; and
sending, by the transit node, a path tear message to the ingress node, wherein the path tear message comprises the first location information of the fault point.

10. The method for sending location information of the fault point according to claim 9, wherein the sending, by the transit node, the resource reservation protocol notify message to the ingress node, comprises:
sending, by the transit node, the resource reservation protocol notify message to the ingress node before sending a second reservation tear message to the ingress node.

11. The method for sending location information of the fault point according to claim 8, wherein at least one node is connected between the transit node and the ingress node; and
the sending, by the transit node, the first location information of the fault point to the ingress node of the tunnel, comprises at least one step of the two steps:
sending, by the transit node, the first location information of the fault point to the ingress node directly; and
sending, by the transit node, the first location information of the fault point to the ingress node by using at least one node among the at least one node.

12. The method for sending location information of the fault point according to claim 8, further comprising:
sending, by the transit node, second location information of the fault point to a network management device, wherein the second location information of the fault point comprises information about an interface that is connected to the fault point and located on the transit node.

13. The method for sending location information of the fault point according to claim 12, wherein the sending, by the transit node, second location information of the fault point to the network management device, comprises:
sending, by the transit node, link fault alarm information to the network management device, wherein the link fault alarm information comprises the second location information of the fault point.

14. A method for processing fault alarm information, comprising:
receiving, by a network management device, tunnel fault alarm information sent by an ingress node of a tunnel, wherein the tunnel fault alarm information comprises first location information of a fault point on a link traversed by the tunnel, and the first location information of the fault point comprises an identifier of an upstream node of the fault point and an identifier of an interface that is connected to the fault point and located on the upstream node of the fault point; and
determining, by the network management device, a location of the fault point corresponding to a tunnel fault according to the first location information of the fault point,
receiving, by the network management device, link fault alarm information sent by the upstream node of the fault point, wherein the link fault alarm information comprises second location information of the fault point, and the second location information of the fault point comprises information about the interface that is connected to the fault point and located on the upstream node of the fault point; and
determining, by the network management device according to the first location information of the fault point and the second location information of the fault point, that a link fault alarm corresponding to the link fault alarm information is a root cause alarm of a tunnel fault alarm corresponding to the tunnel fault alarm information.

15. The method for processing fault alarm information according to claim 14, wherein: the tunnel fault alarm information further comprises a fault cause corresponding to the fault point;

the method further comprises:
obtaining, by the network management device, the fault cause corresponding to the fault point from the tunnel fault alarm information; and
the determining, by the network management device according to the first location information of the fault point and the second location information of the fault point, that the link fault alarm corresponding to the link fault alarm information is the root cause alarm of the tunnel fault alarm corresponding to the tunnel fault alarm information, comprises:
determining, by the network management device according to the first location information of the fault point, the second location information of the fault point, and the fault cause corresponding to the fault point, that the link fault alarm corresponding to the link fault alarm information is the root cause alarm of the tunnel fault alarm corresponding to the tunnel fault alarm information.

16. An ingress node device, comprising:
a processor;
a non-transitory computer readable medium connected to the processor and having instructions stored thereon that, when executed by the processor, cause the ingress node device to:
obtain first location information of a fault point on a link traversed by a tunnel where the ingress node device is located, wherein the first location information of the fault point comprises an identifier of an upstream node of the fault point and an identifier of an interface that is connected to the fault point and located on the upstream node of the fault point; and
provide the first location information of the fault point to a user so that the user determines a location of the fault point corresponding to a tunnel fault,
wherein the instructions causing the ingress node device to obtain first location information of the fault point comprise instructions that, when executed by the processor, cause the ingress node device to perform at least one item of the items (a)-(d):
(a) when perceiving a fault of a link between the ingress node device and a downstream node of the ingress node device or perceiving a fault of the downstream node of the ingress node device, obtaining an identifier of the ingress node device and an identifier of an interface that is connected to the downstream node of the ingress node device and located on the ingress node device, and using these identifiers as the first location information of the fault point, wherein the ingress node device is the upstream node of the fault point;
(b) when perceiving mismatch between configuration information corresponding to the tunnel on the ingress node device and configuration information corresponding to the tunnel on a downstream node of the ingress node device, obtaining an identifier of the ingress node device and an identifier of an interface that is connected to the downstream node of the ingress node device and located on the ingress node device, and using these identifiers as the first location information of the fault point, wherein the ingress node device is the upstream node of the fault point;
(c) when perceiving timeout of transmission between the ingress node device and a downstream node of the ingress node device, obtaining an identifier of the ingress node device and an identifier of an interface that is connected to the downstream node of the ingress node device and located on the ingress node device, and using these identifiers as the first location information of the fault point, wherein the ingress node device is the upstream node of the fault point; and
(d) receiving the first location information of the fault point sent by the upstream node of the fault point.

17. The ingress node device according to claim 16, wherein the instructions causing the ingress node device to receive the first location information of the fault point sent by the upstream node of the fault point comprise instructions that, when executed by the processor, cause the ingress node device to perform at least one step of:
receiving a resource reservation protocol notify message sent by the upstream node of the fault point, wherein the resource reservation protocol notify message comprises the first location information of the fault point;
receiving a first reservation tear message sent by the upstream node of the fault point, wherein the first reservation tear message comprises the first location information of the fault point;
receiving a path error message sent by the upstream node of the fault point, wherein the path error message comprises the first location information of the fault point;
receiving a reservation error message sent by the upstream node of the fault point, wherein the reservation error message comprises the first location information of the fault point; and
receiving a path tear message sent by the upstream node of the fault point, wherein the path tear message comprises the first location information of the fault point.

18. The ingress node device according to claim 17, wherein the instructions causing the ingress node device to obtain first location information of the fault point comprise instructions that, when executed by the processor, cause the ingress node device to receive the resource reservation protocol notify message sent by the upstream node of the fault point before receiving a second reservation tear message sent by the upstream node of the fault point.

19. The ingress node device according to claim 16, wherein at least one node is connected between the ingress node device and the upstream node of the fault point; and
wherein the instructions causing the ingress node device to receive the first location information of the fault point sent by the upstream node of the fault point comprise instructions that, when executed by the processor, cause the ingress node device to perform at least one of:
receiving the first location information of the fault point directly sent by the upstream node of the fault point; and
receiving the first location information of the fault point sent by the upstream node of the fault point by using at least one node among the at least one node.

20. The ingress node device according to claim 16, wherein the instructions causing the ingress node device to provide the first location information of the fault point to the user comprise instructions that, when executed by the processor, cause the ingress node device to perform-at least one item of the items (a) and (b):
(a) providing the first location information of the fault point to a network management device so that the user determines the location of the fault point corresponding to the tunnel fault by using the network management device; and
(b) receiving a query command input by the user, and displaying the first location information of the fault point to the user according to the query command, so that the user determines the location of the fault point corresponding to the tunnel fault, wherein the query command comprises identification information of the tunnel.

21. The ingress node device according to claim 20, wherein the instructions causing the ingress node device to provide the first location information of the fault point to the network management device so that the user determines the location of the fault point corresponding to the tunnel fault by using the network management device comprise instructions that, when executed by the processor, cause the ingress node device to perform at least one item of the items (a) and (b):

(a) generating tunnel fault alarm information that carries the first location information of the fault point, and sending the tunnel fault alarm information to the network management device so that the user determines the location of the fault point corresponding to the tunnel fault by using the network management device; and (b) receiving a location information obtaining request sent by the network management device, and providing the first location information of the fault point to the network management device according to the location information obtaining request, so that the user determines the location of the fault point corresponding to the tunnel fault by using the network management device, wherein the location information obtaining request comprises identification information of the tunnel.

22. The ingress node device according to claim 21, wherein the instructions causing the ingress node device to provide the first location information of the fault point to the user comprise instructions that, when executed by the processor, cause the ingress node device to add a fault cause corresponding to the fault point into the tunnel fault alarm information.

23. A transit node device, comprising:
a processor;
a non-transitory computer readable medium connected to the processor and having instructions stored thereon that, when executed by the processor, cause the transit node device to:
obtain first location information of a fault point on a link traversed by a tunnel where the transit node device is located, wherein the first location information of the fault point comprises an identifier of the transit node device and an identifier of an interface that is connected to the fault point and located on the transit node device, wherein the transit node device is an upstream node of the fault point; and
send the first location information of the fault point to an ingress node of the tunnel so that the ingress node provides a user with the first location information of the fault point corresponding to a tunnel fault;
wherein the instructions causing the transit node device to obtain first location information of the fault point on the link traversed by the tunnel where the transit node device is located comprise instructions that, when executed by the processor, cause the transit node device to perform at least one item of the items (a)-(c):
(a) when perceiving a fault of a link between the transit node device and a downstream node of the transit node device or perceiving a fault of the downstream node of the transit node device, obtaining the identifier of the transit node device and an identifier of an interface that is connected to the downstream node of the transit node device and located on the transit node device, and using these identifiers as the first location information of the fault point;

(b) when perceiving mismatch between configuration information corresponding to the tunnel on the transit node device and configuration information corresponding to the tunnel on a downstream node of the transit node device, obtaining the identifier of the transit node device and an identifier of an interface that is connected to the downstream node of the transit node device and located on the transit node device, and using these identifiers as the first location information of the fault point; and (c) when perceiving timeout of transmission between the transit node device and a downstream node of the transit node device, obtaining the identifier of the transit node device and an identifier of an interface that is connected to the downstream node of the transit node device and located on the transit node device, and using these identifiers as the first location information of the fault point.

24. The transit node device according to claim 23, wherein the instructions causing the transit node device to send the first location information of the fault point to an ingress node of the tunnel comprise instructions that, when executed by the processor, cause the transit node device to perform at least one of:
sending a resource reservation protocol notify message to the ingress node, wherein the resource reservation protocol notify message comprises the first location information of the fault point;
sending a first reservation tear message to the ingress node, wherein the first reservation tear message comprises the first location information of the fault point;
sending a path error message to the ingress node, wherein the path error message comprises the first location information of the fault point;
sending a reservation error message to the ingress node, wherein the reservation error message comprises the first location information of the fault point; and
sending a path tear message to the ingress node, wherein the path tear message comprises the first location information of the fault point.

25. The transit node device according to claim 24, wherein the instructions causing the transit node device to send the first location information of the fault point to an ingress node of the tunnel comprise instructions that, when executed by the processor, cause the transit node device to send the resource reservation protocol notify message to the ingress node before sending a second reservation tear message to the ingress node.

26. The transit node device according to claim 23, wherein at least one node is connected between the transit node device and the ingress node; and
wherein instructions causing the transit node device to send the first location information of the fault point to an ingress node of the tunnel comprise instructions that, when executed by the processor, cause the ingress node device to perform at least one of:
sending the first location information of the fault point to the ingress node directly; and
sending the first location information of the fault point to the ingress node by using at least one node among the at least one node.

27. The transit node device according to claim 23, wherein the non-transitory computer readable medium further has instructions stored thereon that, when executed by the processor, cause the ingress node device to:
send second location information of the fault point to a network management device, wherein the second location information of the fault point comprises information about the interface that is connected to the fault point and located on the transit node device.

28. The transit node device according to claim 27, wherein the instructions causing the transit node device to send second location information of the fault point to a network management device comprise instructions that, when executed by the processor, cause the transit node device to send link fault alarm information to the network management device, wherein the link fault alarm information comprises the second location information of the fault point.

29. A network management device, comprising:
a processor;
a non-transitory computer readable medium connected to the processor and having instructions stored thereon that, when executed by the processor, cause the network management device to:
receive tunnel fault alarm information sent by an ingress node of a tunnel, wherein the tunnel fault alarm information comprises first location information of a fault point on a link traversed by the tunnel, and the first location information of the fault point comprises an identifier of an upstream node of the fault point and an identifier of an interface that is connected to the fault point and located on the upstream node of the fault point; and
determine a location of the fault point corresponding to a tunnel fault according to the first location information of the fault point,
receive link fault alarm information sent by the upstream node of the fault point, wherein the link fault alarm information comprises second location information of the fault point, and the second location information of the fault point comprises information about the interface that is connected to the fault point and located on the upstream node of the fault point; and
determine, according to the first location information of the fault point and the second location information of the fault point, that a link fault alarm corresponding to the link fault alarm information is a root cause alarm of a tunnel fault alarm corresponding to the tunnel fault alarm information.

30. The network management device according to claim 29, wherein the tunnel fault alarm information further comprises a fault cause corresponding to the fault point;
wherein the instructions causing the network management device to determine a location of the fault point corresponding to a tunnel fault comprise instructions that, when executed by the processor, cause the network management device to obtain the fault cause corresponding to the fault point from the tunnel fault alarm information; and
wherein the instructions causing the network management device to determine that a link fault alarm corresponding to the link fault alarm information is a root cause alarm of a tunnel fault alarm comprise instructions that, when executed by the processor, cause the network management device to determine according to the first location information of the fault point, the second location information of the fault point, and the fault cause corresponding to the fault point, that the link fault alarm corresponding to the link fault alarm information is the root cause alarm of a tunnel fault alarm corresponding to the tunnel fault alarm information.

* * * * *